US012073048B2

United States Patent

Yellepeddi et al.

(10) Patent No.: US 12,073,048 B2

(45) Date of Patent: Aug. 27, 2024

(54) FRONT-FACING PROXIMITY DETECTION USING CAPACITIVE SENSOR

(71) Applicant: Analog Devices, Inc., Wilmington, MA (US)

(72) Inventors: Atulya Yellepeddi, Medford, MA (US); Harshvardhan Bhatia, Woburn, MA (US); Jiayi Jiang, Marlborough, MA (US); Reuben Harry Cohn-Gordon, Cambridge, MA (US); Johannes Traa, Medford, MA (US); Sai Kulkarni, Cambridge, MA (US)

(73) Assignee: Analog Devices, Inc., Wilmington, MA (US)

( * ) Notice: Subject to any disclaimer, the term of this patent is extended or adjusted under 35 U.S.C. 154(b) by 101 days.

(21) Appl. No.: 17/693,644

(22) Filed: Mar. 14, 2022

(65) Prior Publication Data

US 2022/0300111 A1 Sep. 22, 2022

Related U.S. Application Data

(60) Provisional application No. 63/161,774, filed on Mar. 16, 2021.

(51) Int. Cl.
*G06F 3/044* (2006.01)

(52) U.S. Cl.
CPC .. *G06F 3/0443* (2019.05); *G06F 2203/04101* (2013.01); *G06F 2203/04104* (2013.01)

(58) Field of Classification Search
CPC ......... G06F 3/0443; G06F 2203/04101; G06F 2203/04104; G06F 3/044; G06F 3/0418
See application file for complete search history.

(56) References Cited

U.S. PATENT DOCUMENTS

| | | | | |
|---|---|---|---|---|
| 9,104,278 | B2 | 8/2015 | Oya | |
| 10,235,004 | B1 * | 3/2019 | Lynn | G06F 3/0418 |
| 11,650,702 | B2 * | 5/2023 | Kim | G06F 3/044 345/174 |
| 2012/0050180 | A1 * | 3/2012 | King | G06F 3/041662 345/173 |
| 2016/0357299 | A1 * | 12/2016 | Liu | G06F 3/0443 |
| 2017/0147109 | A1 | 5/2017 | Elias et al. | |
| 2017/0300168 | A1 * | 10/2017 | Wu | G06F 3/04182 |
| 2018/0116112 | A1 * | 5/2018 | French, Jr. | A01D 41/127 |

FOREIGN PATENT DOCUMENTS

| | | |
|---|---|---|
| WO | 2021101916 | 5/2021 |

* cited by examiner

*Primary Examiner* — Christopher P McAndrew
*Assistant Examiner* — Zannatul Ferdous
(74) *Attorney, Agent, or Firm* — ARENTFOX SCHIFF LLP

(57) ABSTRACT

A device for proximity detection includes multiple electrodes and an impedance sensor coupled to the electrodes. The impedance sensor may include three impedance elements and a sensing element arranged in a bridge configuration to offset an external impedance and detect changes to impedance in the environment of the device. The device further includes a proximity detector that obtains sensor measurements between multiple subsets of electrodes and analyzes the sensor measurements to determine whether an object is approaching the device.

20 Claims, 10 Drawing Sheets

100
102-1
102-2
102-5
Proximity Sensor 104
102-3
102-4
y z x
108
106
100
110
114
112

FRONT-FACING PROXIMITY DETECTION USING CAPACITIVE SENSOR

PRIORITY DATA

This application claims priority to U.S. provisional patent application No. 63/161,774, filed Mar. 16, 2021, entitled "FRONT-FACING PROXIMITY DETECTION USING CAPACITIVE SENSOR," which is hereby incorporated by reference in its entirety.

TECHNICAL FIELD OF THE DISCLOSURE

The present invention relates to the field of proximity detection, in particular to front-facing proximity detection using a capacitive sensor.

BACKGROUND

Front-facing proximity sensors are used in smartphones to detect the presence or location of an object that is near to the front of the device (i.e., in front of the smartphone screen), but not in physical contact with the device. For example, if a smartphone detects a user's face near the screen during a phone call, the smartphone may automatically turn off the display to prevent accidental keypresses and reduce battery consumption. Directional proximity sensors may be used in other types of devices, such as watches, earphones, smart glasses, tablets, etc., and the device may control various device behaviors in response to detecting an object (e.g., a user's head, or a user's hand) in proximity to the device, or at a particular location relative to the device.

Current devices use infrared sensors for proximity detection. In some implementations, an infrared sensor is included in a notch or other area on the front side, which cuts into the screen space. In other implementations, an infrared sensor is included on a moveable element that pops out of a side of the screen. Including an infrared sensor as an element on the device's front reduces the available area for the display screen. Infrared sensors that extend from a side of the device preserves screen space, but such moveable elements are prone to mechanical problems.

As another option, one or more infrared sensors may be included under the display, preserving real estate on the front of the device for the screen, and removing mechanical complexity. However, use of the infrared sensor underneath the screen may lead to pixel burn-in, which reduces user experience. Below-screen infrared sensors also increase manufacturing costs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1A:
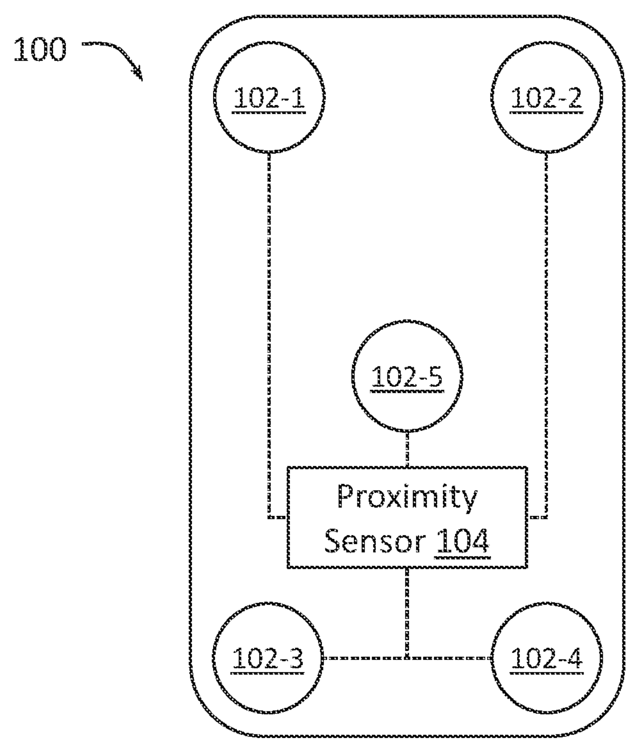
FIGS. 1A and 1B illustrate an example a proximity detection system and an example sensing range for the proximity detection system, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

As disclosed herein, a capacitive sensor system is included in a device, such as a smartphone, and used for proximity detection, e.g., front-facing proximity detection. An array of sensor electrodes can be embedded in a device, such as under a smartphone screen, and coupled to a capacitance sensor. The array of electrodes may include three or more electrodes at different positions along the screen. Various pairs or subsets of the array of electrodes can be coupled to the capacitance sensor, e.g., using a switching matrix that selects a subset of electrodes. The capacitance sensor applies a voltage across the selected electrodes and measures a capacitance, or a quantity related to capacitance, between the selected electrodes. The switching matrix can alternately select different sets of electrodes (e.g., different pairs of electrodes) to detect capacitance in various directions or regions relative to the device. A proximity detector coupled to the capacitance sensor receives the capacitance measurements and looks for a change in capacitance over time. A change in capacitance is caused by an object moving in the vicinity of the sensor.

A bridge-based capacitance sensor system may be used to measure capacitance between subsets of electrodes. A capacitance bridge (or, more generally, impedance bridge) with one or more variable elements is used to balance a fixed impedance in the sensing environment, so that the sensor system can detect small changes in a load impedance on top of the fixed impedance. The variable element or elements may be adjusted based on a current fixed impedance in the sensing environment. For example, a smartphone's antenna creates a large, fixed capacitance (e.g., 200 pF) relative to the capacitance change caused by the user's head nearing the smartphone (on the order of 1 fF). By using the variable element(s) of the impedance bridge to cancel out the large, fixed impedance of the antenna, the impedance bridge sensor is able to detect a small change in capacitance in the presence of a large, fixed capacitance. In some embodiments, one or more variable elements in the impedance bridge are adjusted based on the electrodes selected by the switching matrix, e.g., if the fixed capacitance between a first pair of electrodes is different from a fixed capacitance between a second pair of electrodes.

To perform proximity detection, the bridge-based capacitance sensor system is used in a mutual-sensing configuration. In a mutual-sensing mode, the capacitance sensor may be coupled to a pair of electrodes, so that one electrode is coupled to an output terminal of the impedance bridge and another electrode is coupled to an input terminal of the impedance bridge. The electrode coupled to the input terminal receives a periodic (e.g., sinusoidal) stimulus signal applied to the input terminal, and a periodic stimulus signal with opposite phase is applied to another input terminal on the opposite side of the impedance bridge. The in-phase and opposite phase (also referred to as antiphase) stimulus signals cancel out at the output terminals of a balanced impedance bridge, so that the output reflects the impedance change from the offset impedance, and does not reflect the offset impedance itself.

Measurements from various pairs or subsets of electrodes under the device's display screen may be used to localize an object in the vicinity of the device. For example, if a pair of electrodes on a right side of the device observe a change in capacitance, and a pair of electrodes on a left side of the device does not observe a change in capacitance, this indicates that an object is approaching the device from the right side. If a device detects a change in capacitance by electrodes on both the right and left sides, this indicates that an object is approaching the device from the front. In a smartphone implementation, the metal case around the sides and back of the device may inhibit capacitance detection around the sides or to the back of the device. For example, the sensor system may detect objects approaching the front face at an angle of −45° to 45°. The case reduces the likelihoods of false-positive detection for objects that are not approaching the device from the front. Electrodes positions closer to the center of the screen may narrow the angle of detection, so that the proximity detector detects objects approaching from a narrower angle.

A processor or other type of proximity detector circuitry processes measurements obtained by the capacitance sensor to detect an object approaching the device. The proximity detector may perform filtering or smoothing of the capacitance measurements, e.g., to reduce noise in the measurement signals. The proximity detector detects an object approaching the device from the front in response to detecting at least a threshold change in capacitance for multiple subsets of electrodes. In some embodiments, the proximity detector detects objects approaching from other directions, e.g., from a side, or from the top or bottom of the device. A device including the proximity detector may change its behavior in response to detecting an approaching object, or in response to detecting an object in a particular direction. For example, the device may turn a display screen off or on, change an audio volume, or change a microphone setting.

Proximity detection is generally discussed herein from a device frame of reference. In general, it should be understood that an object can be considered to be "approaching" a device if the relative positions of the device and an object are moving closer together. This may be because the object (e.g., a user's hand) is approaching a stationary device, because the device is moving through space towards a stationary object (e.g., a smartphone is being raised towards a user's head), or because both the device and the object are moving towards each other.

Embodiments of the present disclosure provide a sensor system that includes a sensor and a proximity detector. The sensor is couplable to a plurality of electrodes, each of the plurality of electrodes at a different position on a face of a device. The sensor obtains a first set of measurements between a first subset of the plurality of electrodes, the first set of measurements related to capacitance between the first subset of the electrodes. The sensor also obtains a second set of measurements between a second subset of the plurality of electrodes, the second set of measurements related to capacitance between the second subset of the electrodes. The proximity detector detects at least a first threshold change in the first set of measurements, detects at least a second threshold change in the second set of measurements Further embodiments of the present disclosure provide a proximity detection method that includes obtaining a first set of measurements between a first subset of a plurality of electrodes along a face of a device, the first set of measurements related to capacitance between the first subset of the electrodes; obtaining a second set of measurements between a second subset of the plurality of electrodes, the second set of measurements related to capacitance between the second subset of the electrodes; detecting at least a first threshold change in the first set of measurements; detecting at least a second threshold change in the second set of measurements; and in response to detecting at least the first threshold change in the first set of measurements and detecting at least the second threshold change in the second set of measurements, outputting a signal indicating that an object is approaching the face of the device.

Additional embodiments of the present disclosure provide a sensor system that includes a plurality of electrodes arranged at different positions along a face of a device, a sensor coupled to the plurality of electrodes, and a proximity detector. The sensor obtains a first set of measurements related to a mutual-mode capacitance between a first pair of the plurality of electrodes, and a second set of measurements related to a mutual-mode capacitance between a second pair of the plurality of electrodes. The proximity detector detects at least a threshold change in the first set of measurements, detects at least the threshold change in the second set of measurements, and outputs a detection signal in response to detecting at least the threshold change in the first set of measurements and detecting at least the threshold change in the second set of measurements.

As will be appreciated by one skilled in the art, aspects of the present disclosure, in particular aspects of a capacitive sensor for front-facing proximity detection, described herein, may be embodied in various manners (e.g., as a method, a system, a computer program product, or a computer-readable storage medium). Accordingly, aspects of the present disclosure may take the form of a hardware embodiment, a software embodiment (including firmware, resident software, micro-code, etc.), or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example Proximity Detection System

FIG. 1A illustrates an example proximity detection system, according to some embodiments of the present disclosure. In this example, the proximity detection system is implemented in a device 100, which may be a smartphone, tablet, or other device having a main front screen used to access the device. The device 100 has a face, which may be, for example, an area of the device having a screen, touchscreen, and/or other user interface features for interacting with the device. In other embodiments, the face may refer to any side or portion of a device for which proximity detection may be used. As other examples, a device face may be a watch face, a portion of an earphone, a portion of a pair of smart glasses, etc. In some examples, a device may have multiple faces (e.g., multiple screens), and the device may include one or more proximity detection systems implemented to detect proximity towards one or more of the faces.

The proximity detection system includes five electrodes 102 at different positions along the face of the device 100. Four of the electrodes 102-1, 102-2, 102-3, and 102-4 are located near the corners of the face of the device. For example, if the device 100 is a smartphone, each of the electrodes 102-1 through 102-4 is near a corner of the display screen of the smartphone. A fifth electrode 102-5 is positioned near the center of the display screen of the device 100. The electrodes 102 may be metallic sensor pads capable of generating an electric field. While circular electrodes 102 are illustrated in FIG. 1A, the electrodes 102 may have other geometries and sizes.

Figure 1B:
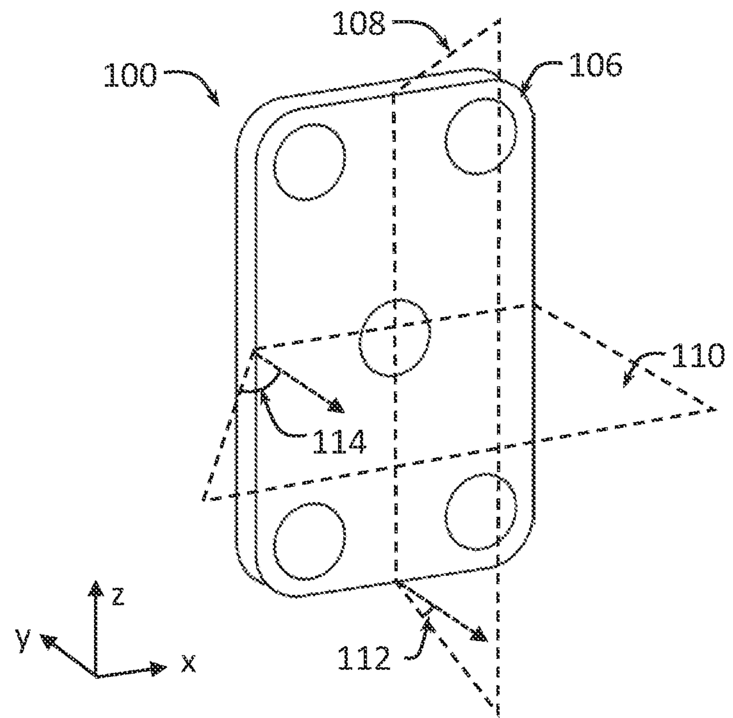

The electrodes 102 may be positioned behind a display device implemented on the device face, e.g., a light emitting device (LED) screen, liquid crystal display (LCD), or thin film transistor (TFT) LED screen, any of which may be implemented as a touchscreen. The electrodes 102 are typically not visible to a user. An electric field may be generated between a subset of the electrodes 102, and the electric field may extend through the screen and into a region outside the device 100. An example sensing range is illustrated in FIG. 1B.

The proximity detection system further includes a proximity sensor 104 coupled to the electrodes 102. The proximity sensor 104 may be implemented in circuitry housed in the device 100, and typically is not visible from the outside of the device. The proximity sensor 104 includes a capacitive sensor (or, more generally, an impedance sensor) that is coupled to the electrodes 102. The impedance sensor is used to measure a change in capacitance (or more generally, a change in impedance) in an environment around the device 100. The proximity sensor 104 further includes a proximity detector. For proximity detection, the impedance sensor may configured in a mutual-sensing mode, also referred to as mutual-mode. In the mutual-sensing mode, the impedance sensor forms a capacitor between two electrodes, with an electric field spanning the electrodes. More specifically, the impedance sensor selectively couples to a subset of the electrodes 102 and generates an electric field spanning the selected electrodes 102. In some embodiments, the impedance sensor may be alternately configured in a self-sensing mode. In the self-sensing mode, the impedance sensor measures impedance between an electrode (e.g., one of the electrodes 102) and a ground. When an object is placed near the electrode, the object modifies the electric field between the electrode and the ground and increases the measured capacitance.

In the mutual-sensing mode, the electric field generated between a subset of electrodes 102 extends outside the device 100, including a region in front of the front face of the device 100. When a di-electric or metallic object is inserted into the electric field, the capacitance between the two electrodes changes. In the case of a di-electric change between the electrodes, the polarization of the di-electric affects the net capacitance observed between the electrodes. In the case of a metallic change between the electrodes, the introduction of the surface charge distribution between the electrodes may modify the electric field distribution, which may change the net capacitance observed between the electrodes. The measurements obtained by the impedance sensor may be capacitance measurements, or they may be related to capacitance. For example, the impedance sensor may capture voltage measurements, which are related to capacitance (C=q/V, where C is capacitance, q is charge, and V is voltage).

The impedance sensor obtains sets of measurements between various subsets of the electrodes 102. Different subsets of electrodes 102 may be selected to detect objects in different positions or directions relative to the device 100. For example, a first subset of electrodes 102 (e.g., electrodes 102-1 and 102-3) that generate an electric field on a left side of the face of the device 100 may be used to detect objects near the left side of the device 100, and a second subset of electrodes 102 (e.g., electrodes 102-2 and 102-4) that generate an electric field on a right side of the face of the device 100 may be used to detect objects near the right side of the device 100. As another example, the impedance sensor may obtain sets of measurements between each of the corner electrodes 102-1 through 102-4 and the center electrode 102-5 (e.g., a first set of measurements between electrodes 102-1 and 102-5, a second set of measurements between electrodes 102-2 and 102-5, etc.). In other implementations, the electrodes 102 may have different configurations (e.g., any of the configurations illustrated in FIG. 8), and the impedance sensor may obtain sets of measurements for different subsets of electrodes 102. In some embodiments, the impedance sensor may obtain a set of measurements between a subset of three or more electrodes 102. The impedance sensor is described in greater detail with respect to FIGS. 2-7.

The impedance sensor is coupled to a proximity detector that determines whether an object is within a proximity of the face of the device 100, e.g., if an object is approaching the face of the device 100. The proximity detector receives sets of measurements obtained by the impedance sensor, and the proximity detector processes the received measurements to determine whether there has been at least a threshold change in the measurement (e.g., at least a threshold change in a capacitance measurement, or at least a threshold change in measured voltage). For example, if the proximity detector detects at least the threshold change in multiple sets of measurements received from the impedance sensor, the proximity detector determines that an object is approaching the face of the device 100. The proximity detector may apply various rules for determining directionality of an object approaching the device 100. For example, for front-facing proximity detection, the proximity detector may look for a threshold change in one subset of measurements related to capacitance on one side of the device (e.g., a left side of the device) and a threshold change in a second subset of measurements related to capacitance on another side of the device (e.g., a right side of the device). The proximity detector may apply the same threshold to each set of measurements. Alternatively, the proximity detector may apply different thresholds to different measurement sets, e.g., different thresholds for different subsets of electrodes may be based on calibration data for the impedance sensor.

As one example based on the electrode arrangement shown in FIG. 1, the proximity detector may detect an object approaching from the front of the device if the measurements for one of the electrode pairs (102-1, 102-5) and (102-2, 102-5) exceeds a threshold change, and if the measurements for one of the electrode pairs (102-3, 102-5) and (102-4, 102-5) exceeds the threshold change. Different electrode subsets may also be used to determine if an object is approaching from a particular side of the device 100. For example, if measurements for both of the electrode pairs (102-1, 102-5) and (102-2, 102-5) exceed a threshold change, and measurements for neither of the electrode pairs (102-3, 102-5) and (102-4, 102-5) exceeds the threshold change, this may indicate that an object is approaching the device 100 from the left side of the device. Additional details of the proximity detector are described in relation to FIG. 2.

FIG. 1B illustrates an example sensing range for the proximity detection system of the device 100, according to some embodiments of the present disclosure. FIG. 1B provides a three-dimensional perspective view of the device 100 and includes an x-y-z coordinate system, where the front face 106 of the device 100 is in the x-z plane, and the device 100 extends back in the y-direction. The electrodes 102 may be positioned behind the face 106 of the device 100 in the y-direction, e.g., behind a touchscreen, as described with respect to FIG. 1A.

FIG. 1B illustrates two example planes 108 and 110 extending out from the face 106 of the device 100. The planes 108 and 110 show portions of a sensing range of the device 100. In the case of a smartphone or other device with a main front display, a housing around the device 100 (e.g., a metal housing surrounding the back and sides of the device) may prevent electric fields between subsets of electrodes from extending through the housing. Thus, the electric fields, and corresponding sensing range of the proximity detection system, extend mainly towards a front of the device 100. The proximity detection system may thus detect objects approaching the face 106 from the front of the device, but may not detect objects approaching from a back of the device.

In some embodiments, the proximity detection system may be configured to detect objects approaching the face 106 at an angle extending outward from the four edges of the face 106, in the direction of one or more sides of the device 100. As illustrated in FIG. 1B, the range may extend downward from the lower edge of the face 106 by a first angle 112, and the range may extend sideways from the left edge of the face 106 by a second angle 114. The range may also extend upwards from an upper edge of the face 106 by the same first angle 112 or a different angle, and sideways from the right edge of the face 106 by the same second angle 114 or a different angle, depending on the electrode configuration and/or other physical device characteristics. The first and second angles 110 and 112 may be the same or different, depending on the electrode configuration and/or other physical device characteristics. Each of the angles 110 and 112 may be between 0° and 90°, e.g., between 15° and 60°, between 30° and 60°, around 45°, or in some other range. The angles 110 and 112 may be based at least in part on the electrode positions, e.g., positioning the electrodes 102 nearer to the edges of the device 100 may increase the sensing range (and increase the angles 110 and 112).

Example Proximity Sensor

Figure 2:
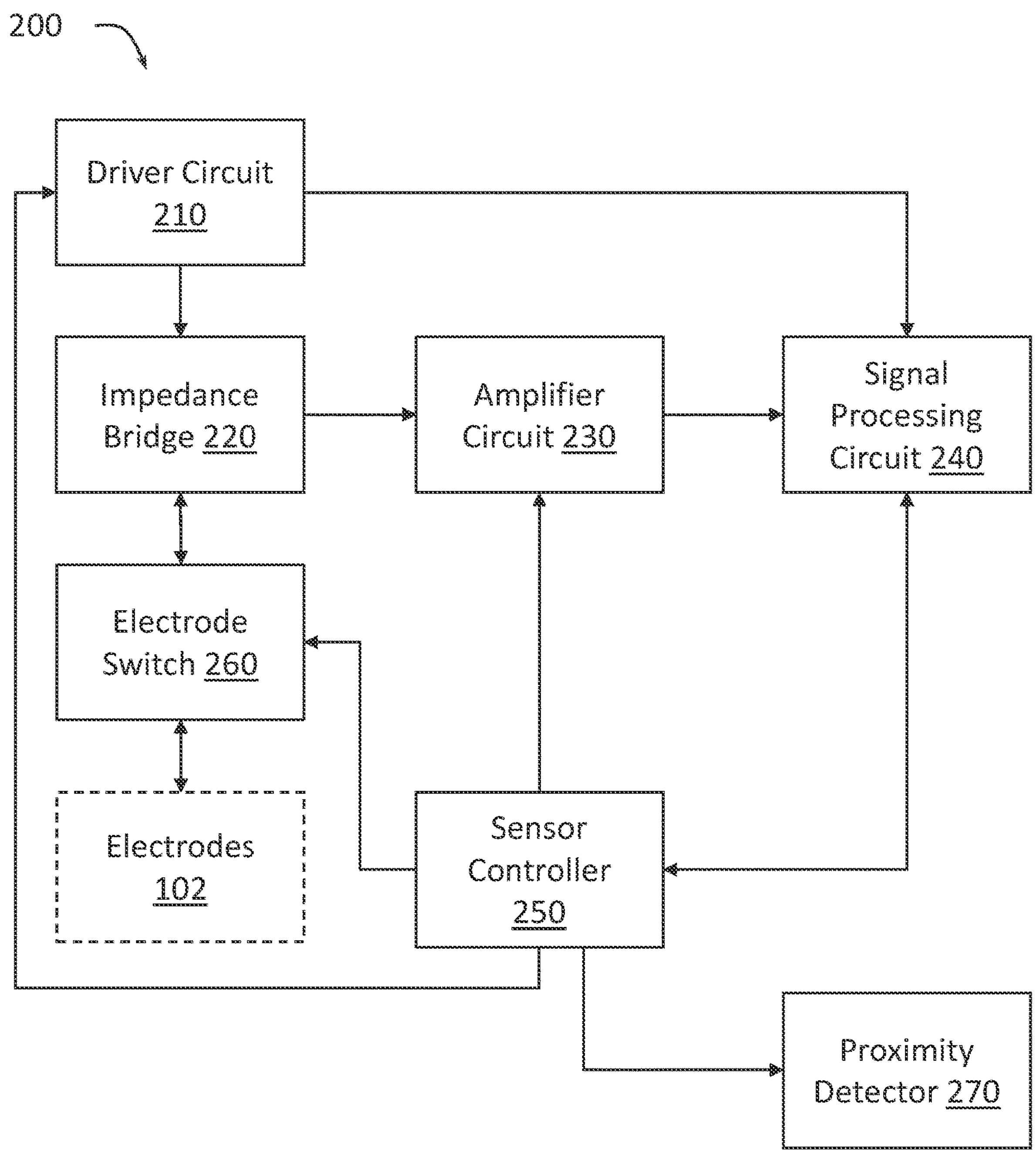
FIG. 2 is a block diagram of a proximity sensor system that can be used for proximity detection, according to some embodiments of the present disclosure.

FIG. 2 is a block diagram of a proximity sensor system 200, according to some embodiments of the present disclosure. The proximity sensor system 200 is an example of the proximity sensor 104 shown in FIG. 1.

The proximity sensor system 200 includes a driver circuit 210, an impedance bridge 220, an amplifier circuit 230, a signal processing circuit 240, a sensor controller 250, an electrode switch 260, and a proximity detector 280. The electrode switch 260 is coupled to a set of electrodes 102, which may be similar to the electrodes 102 shown in FIGS. 1A and 1B. The electrodes 102 may or may not be considered part of the proximity sensor system 200. In alternative configurations, different, fewer, and/or additional components may be included in the proximity sensor system 200 from those shown in FIG. 2. Furthermore, the functionality described in conjunction with one or more of the components shown in FIG. 2 may be distributed among the components in a different manner than described.

Figure 3:
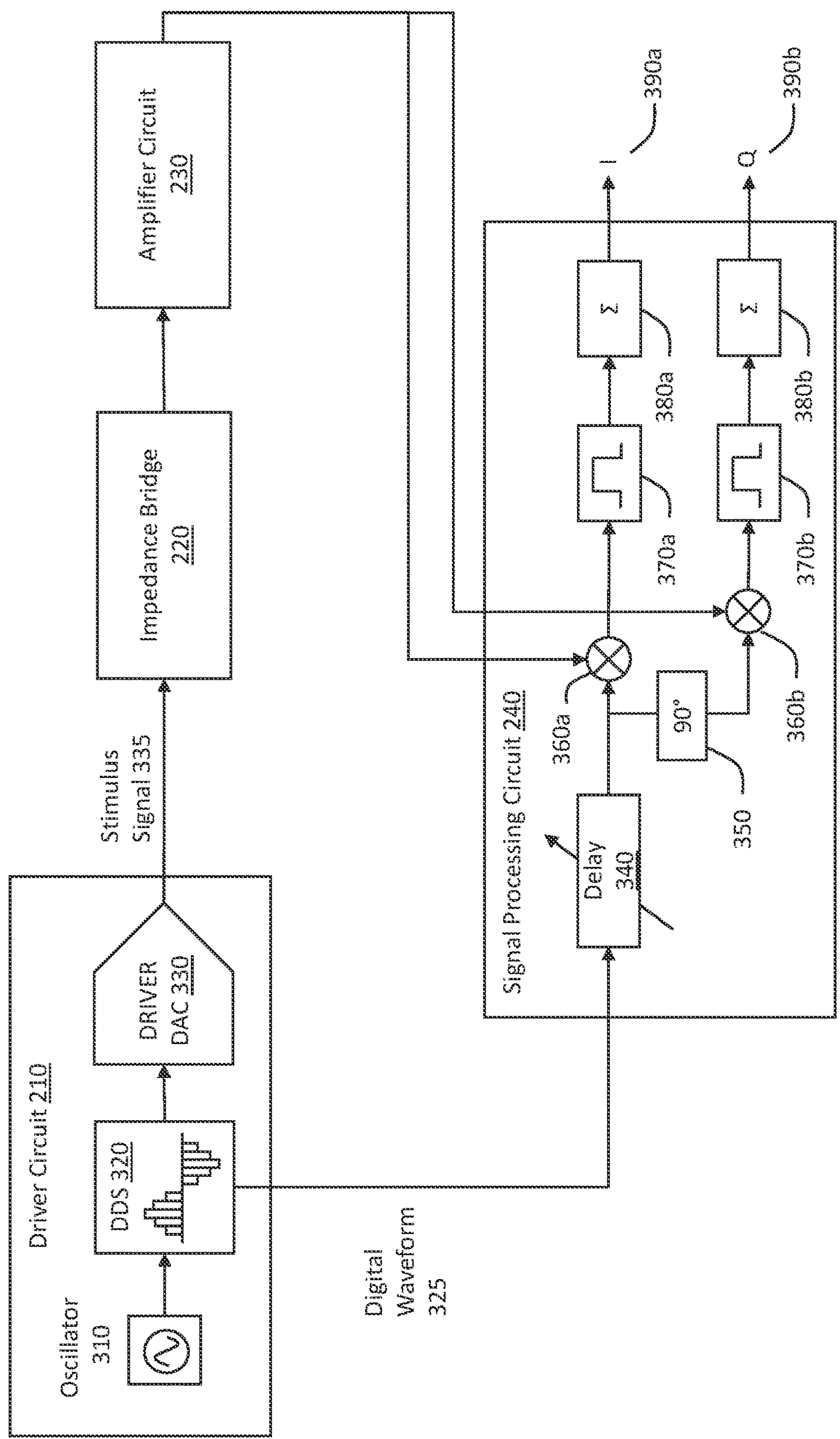
FIG. 3 is a block diagram showing the driver circuit and signal processing circuit of the proximity sensor system of FIG. 2 in greater detail, according to some embodiments of the present disclosure.

The driver circuit 210 generates a stimulus signal that is applied to an input of the impedance bridge 220. The driver circuit 210 generates a periodic signal at a particular frequency, e.g., a sinusoidal signal, a square wave, a triangle wave, etc., and at a particular amplitude. The driver circuit 210 may be configured to adjust the frequency and/or amplitude of the stimulus signal. For example, the driver circuit 210 receives an instruction from the sensor controller 250 indicating the amplitude for the stimulus signal and the frequency for the stimulus signal, and the driver circuit 210 generates a stimulus signal having the instructed amplitude and frequency. The driver circuit 210 may generate a digital waveform that is converted to an analog signal used to drive the impedance bridge 220. The digital or analog waveform generated by the driver circuit 210 may also be provided to the signal processing circuit 240. An example implementation of the driver circuit 210 is shown in FIG. 3.

In some embodiments, the sensor controller 250 instructs the driver circuit 210 to generate a series of stimulus signals at different amplitudes and/or frequencies. In response, the driver circuit 210 generates a sequence of stimulus signals, e.g., a sequence of stimulus signals each having a different frequency. In some embodiments, the amplitude and/or frequency may be fixed. In some embodiments, the sensor controller 250 instructs the driver circuit 210 to generate a stimulus signal that includes multiple stimulus waves at multiple different frequencies, i.e., the stimulus waves at different frequencies are generated simultaneously rather than in a sequence. In response, the driver circuit 210 generates a multiplexed stimulus signal composed of multiple waves. This can reduce the time to perform a scan at multiple frequencies.

In some embodiments, the driver circuit 210 generates two stimulus signals with opposite phase. For example, to generate an antiphase signal, the driver circuit 210 passes a copy of the stimulus signal through an adjustable delay to delay the phase of the stimulus by signal 180°. The in-phase and antiphase signals are used in the mutual-sensing configuration described further below, in particular with respect to FIG. 5. A single stimulus signal may be used for a self-sensing configuration.

The impedance bridge 220 receives the stimulus signal(s) from the driver circuit 210, and one or more of the electrodes 102 coupled to the impedance bridge 220 generate an electric field for sensing impedance in an environment around the impedance bridge 220. The impedance bridge 220 includes three impedance elements, a coupling network, and two output terminals. A first input terminal couples the driver circuit 210 to one side of the impedance bridge 220. A second input terminal couples another side of the impedance bridge 220 to the driver circuit 210 in the mutual-sensing mode used for proximity detection; in a self-sensing mode, this side of the impedance bridge 220 is grounded. At least one of the impedance elements is variable, and the sensor controller 250 can adjust the variable impedance element(s) to balance the offset capacitance. When the stimulus signal or signals are applied to the impedance bridge 220, an electric field is generated in an environment of a sensing electrode (in the self-sensing mode) or a pair of sensing electrodes (in the mutual-sensing mode) coupled to the coupling network. A first output terminal is coupled between the coupling network and one of the impedance elements, and a second output terminal is coupled between the other two impedance elements. The voltage or charge difference between the two output terminals indicates the impedance in the region of the electric field. The impedance bridge is shown in greater detail in FIGS. 4-6B.

The amplifier circuit 230 is connected to the two output terminals of the impedance bridge 220 and is configured to detect and amplify a voltage based on signals from the two output terminals. The amplifier circuit 230 may include one or more programmable gain amplifiers (PGAs) that have adjustable gains; the PGA settings may be received from the sensor controller 250. The amplifier circuit 230 may further convert the analog voltage signal to a digital output; in other embodiments, the amplifier circuit 230 outputs an analog signal. In some embodiments, the configuration of the amplifier circuit 230 may change based on whether the proximity sensor system 200 is in a mutual-sensing mode or self-sensing mode. The configuration of the amplifier circuit 230 in a mutual-sensing mode is described with respect to FIG. 5.

The signal processing circuit 240 is coupled to the amplifier circuit 230 and processes the output of the amplifier circuit 230. The signal processing circuit 140 may also be coupled to the driver circuit 210 to receive a copy of the stimulus signal. The signal processing circuit 240 correlates the stimulus signal from the driver circuit 210 and the output signal to isolate the contribution of the impedance response at the specific frequency of the stimulus signal. The signal processing circuit 240 may demodulate the signal into in-phase and quadrature components. If the stimulus signal includes multiple stimulus frequencies as described above, the signal processing circuit 240 also demodulates the output signal into components for each of the stimulus frequencies. The signal processing circuit 240 may output the demodulated signal to the sensor controller 250, or directly to the proximity detector 270. An example implementation of the signal processing circuit 140 is shown in FIG. 2.

The sensor controller 250 controls the other components of the proximity sensor system 200. The sensor controller 250 may instruct the driver circuit 210 to generate a particular stimulus for the impedance bridge, e.g., a sine wave at a particular amplitude and particular frequency. If the sensor system 200 can alternately be configured in the self-sensing mode and the mutual-sensing mode, the sensor controller 250 instructs the components of the proximity sensor system 200 based on the selected mode. In particular, the sensor controller 250 can select a configuration for the amplifier circuit 230, and can select whether the impedance bridge 220 receives one stimulus signal (for self-mode) or two stimulus signals having opposite phase (for mutual-mode) from the driver circuit 210. The sensor controller 250 may instruct the driver circuit 210 to generate a stimulus signal for a specific mode, e.g., a stimulus signal with one frequency setting and/or amplitude setting in the self-sensing mode, and a stimulus signal with a different frequency setting and/or amplitude setting in the mutual-sensing mode. The sensor controller 250 may comprise one or more microprocessors or other types of circuitry.

The electrode switch 160 is configured to couple the impedance bridge 220 to one or more of the electrodes 102, e.g., to various different subsets of the electrodes 102, as described with respect to FIG. 1A. The electrode switch 260 may be an example of a coupling network and integrated into the impedance bridge 220, or the electrode switch may be connected to a coupling network included in the impedance bridge 220. For example, a device implementing the proximity sensor system 200 includes a set of two or more sensing electrodes 102. In the mutual-sensing mode, the sensor controller 250 instructs the electrode switch 260 to select two of the sensing electrodes. In some embodiments, the electrodes 102 may also include a ground electrode, and the proximity sensor system 200 may include a connection to the ground electrode to ground various elements of the circuitry within the proximity sensor system 200.

Figure 7:
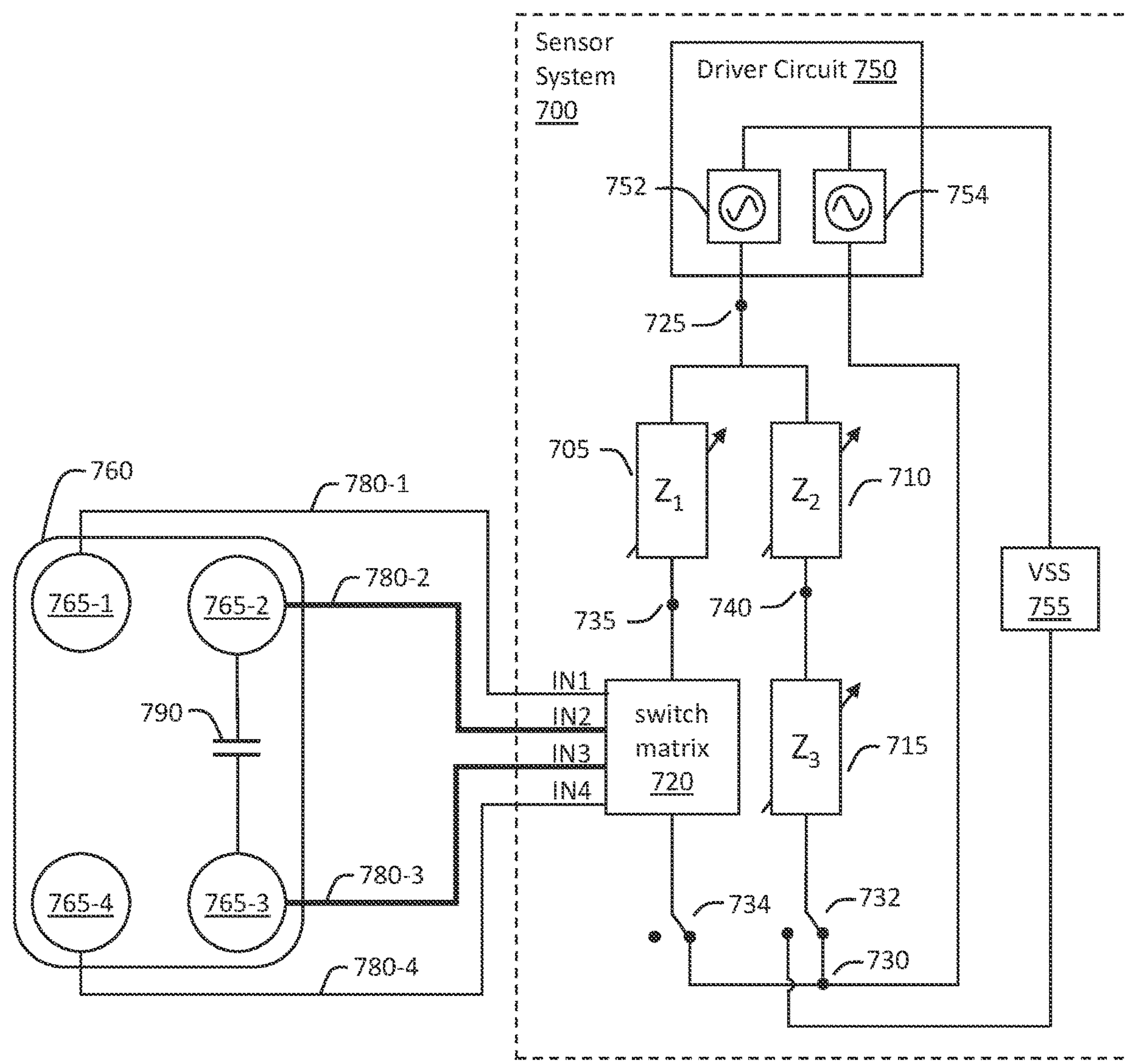
FIG. 7 is a block diagram of an example implementation of a proximity sensor system implemented in a device and configured in a mutual-sensing mode, according to some embodiments of the present disclosure.

In one example, a first sensing electrode (e.g., the center electrode 102-5) is fixedly coupled to one terminal of the coupling network, and a switch (e.g., the electrode switch 260) alternately connects another terminal of the coupling network to a second sensing electrode (e.g., one of the corner electrodes 102-1 through 102-4) in the mutual-sensing mode. In another example, the electrode switch 260 may be a switch matrix that can couple the impedance bridge 220 to a different subset of electrodes selected from a set of electrodes that includes three or more electrodes. In this example, the sensor controller 250 may select two of the electrodes 102 to observe an environment around a particular region of the device, and instruct the electrode switch 260 according to the selection. An example of the switch matrix is shown in FIG. 7.

The proximity detector 270 receives measurements from the impedance sensor, e.g., from the sensor controller 250 (as shown in FIG. 2), or from the signal processing circuit 240. The proximity detector 270 may receive multiple sets of measurements corresponding to multiple subsets of electrodes 102, as described with respect to FIG. 1A. The proximity detector 270 processes the received sets of measurements to determine whether, for each set of measurements, there has been at least a threshold change in the measurements. The proximity detector 270 may use rules to determine whether an object is detected based on the sets of measurements, as described with respect to FIG. 1A.

In some embodiments, the proximity detector 270 filters each set of measurements prior to determining whether a set of measurements exhibits the threshold change, e.g., to smooth noise in the measurements. For example, the proximity detector 270 may receive multiple raw sets of measurements from the sensor controller 250, and apply a noise reduction filter to each set of measurements.

The proximity detector 270 may then calculate a first difference for each set of measurements, also referred to as a first-distance (FD) estimator. The proximity detector 270 receives the measurements as a time series, with each measurement (e.g., each measured capacitance or measured voltage) obtained at a different time. To compute the FD estimator, the proximity detector 270 subtracts the measurement from a previous time (e.g., $C_{t-1}$ or $V_{t-1}$) from the corresponding measurement at a current time (e.g., $C_t$ or $V_t$). The proximity detector 270 may compute the FD estimator using the filtered measurements or, if filtering is not performed, using the raw measurements. The proximity detector 270 computes multiple series of FD estimators, one for each set of measurements corresponding to a respective subset of electrodes.

The proximity detector 270 may then determine, for each FD estimator, whether the FD estimator exceeds a threshold. For example, the proximity detector 270 filters the measurement data for the electrode pair 102-1 and 102-5, calculates an FD estimator for the electrode pair 102-1 and 102-5 based on the filtered measurements, and, if the FD estimator for this pair exceeds a predefined threshold, the proximity detector 270 detects a threshold change for the set of measurements corresponding to the electrode pair 102-1 and 102-5. This may indicate that an object is detected between this pair of electrodes, or an object is moving towards this pair of electrodes. The proximity detector 270 performs a similar process for each of the pairs of electrodes for which it receives measurements.

The proximity detector 270 may apply rules to the FD estimators to determine whether to detect front-facing proximity (e.g., whether an object is approaching the front face 106 of the device 100) and, in response, output a detection signal. For example, the proximity detector 270 may output a detection signal indicating that an object is approaching the front of the device 100 in response to determining that a pair of electrodes on one side of the device (e.g., a left side of the device 100) exceed the threshold at the same time (e.g., within the same time interval) that a pair of electrodes on an opposite side of the device (e.g., a right side of the device 100) exceed the threshold. As another example, the proximity detector 270 may output the detection signal in response to determining that FD estimators for each of a set of electrode pairs (e.g., the pair 102-1 and 102-5; the pair 102-2 and 102-5; the pair 102-3 and 102-5; and the pair 102-4 and 102-5) exceed the threshold. The proximity detector 270 may apply other rules for detecting an object approaching the device 100 from one side of the device, e.g., the proximity detector 270 may output a top side detection signal in response to determining that FD estimators for one or more particular electrode pairs (e.g., the pair 102-1 and 102-5 and the pair 102-2 and 102-5) exceed the threshold, and one or more other electrode pairs (e.g., the pair 102-3 and 102-5 and the pair 102-4 and 102-5) do not exceed the threshold.

In some embodiments, the proximity detector 270 performs a detection smoothing process. In the process described above, a detection is observed when an FD estimator, or a set of FD estimators, exceed the threshold at a particular time, or during a particular time interval, e.g., a time interval during which one measurement from each of the electrode pairs is captured. Due to remaining noise in the FD estimators, the detection process may result in false alarms, missed detections, or a noisy proximity detection signal. A detection smoothing process can reduce false alarms, increase the likelihood of a correct detection, and/or reduce noise in the proximity detection signal. The detection smoothing process may generate a smoothed detection metric, such as a counter or a statistical estimator, e.g., an estimator calculated using a Hidden Markov Model (HMM).

One example detection smoothing process analyzes FD estimators calculated over a period of time, e.g., a continuous period of time, or a moving window. For example, the proximity detector 270 may maintain a counter for the detection signal, where the counter increments if the requisite FD estimators for a given detection signal are above their detection thresholds. The counter increments in response to a detection at a given time, and decrements in response to no detection at a given time. The proximity detector 270 may output a smoothed detection signal based on the counter, e.g., outputting a detection in response to the counter being above 0. A counter may have a limited range, such as −10 to +10, or −20 to +20 (e.g., for a range of −10 to +10, if the count at time t is 10, and the detection signal indicates a detection at time t+1, the count stays at 10 rather than incrementing to 11). Alternatively, the counter may consider measurements within a particular time window, e.g., the past 10 or 20 sets of observations.

As another example, the proximity detector 270 may maintain a counter for each electrode pair, where the counter increments if the FD estimator for an electrode pair above the detection threshold, and decrements if the FD estimator for an electrode pair is below the detection threshold. The proximity detector 270 may output a smoothed detection signal based on the counters, e.g., outputting a detection in response to each of the counters, or some subset of the counters, being above 0. Each counter may have a limited range, such as −10 to +10, or −20 to +20 (e.g., for a range of −10 to +10, if the count at time t is 10, and the FD estimator is above the detection threshold at time t+1, the count stays at 10 rather than incrementing to 11). Alternatively, the counter may consider measurements within a particular time window, e.g., the past 10 or 20 observations.

Another example detection smoothing process uses a Hidden Markov Model (HMM) with an inference algorithm. The proximity detector 270 may define a state space of the HMM as $x_t=(d_t, C_t)$ where $d_t$ is detection (i.e., presence of approach) and $C_t$ is a capacitance at time t. The proximity detector 270 may calculate an estimator for each subset of electrodes using a respective HMM for the electrode subset, where $d_t$ for a given electrode subset is the detection of a threshold change (e.g., detection of the FD estimator being above the threshold) for that electrode subset, and $C_t$ is the capacitance measurement obtained for the electrode subset at time t. It is assumed that the measurements have some noise, and the state space at time t+1 is as follows:

$$d_{t+1} = \begin{cases} d_t, & w \cdot p \cdot \beta \\ 1 - d_t, & w \cdot p \cdot 1 - \beta \end{cases}$$

$$C_{t+1} = d_t(C_t + \Delta)$$

where $\Delta \sim p_\Delta(\delta)$, $\Delta$ is the change in capacitance from sample to sample, which may be characterized with a suitable distribution.

The proximity detector 270 may calculate a smoothed detection signal using the HMM estimators using, e.g., a forward-backwards algorithm, which may be approximated with an Extended Kalman Filter (KF), Unscented KF, Particle Filter, Switching KF, or another algorithm.

Example Driver Circuit and Signal Processing Circuit

FIG. 3 is a block diagram showing the driver circuit 210 and signal processing circuit 240 of the proximity sensor system 200 in greater detail, according to some embodiments of the present disclosure. The driver circuit 210 includes an oscillator 310, a direct digital synthesizer (DDS) 320, and a driver digital-to-analog converter (DAC) 330. The oscillator 310 generates an oscillating signal with a fixed frequency that is used as a reference frequency. The oscillator 310 may be, for example, a crystal oscillator or a surface acoustic wave (SAW) oscillator.

The DDS 320 receives an input frequency from the sensor controller 250, as described above, and generates a digital waveform having the specified frequency. In the example shown in FIG. 3, the DDS 320 generates a digital sine wave. In other embodiments, the DDS 320 may be configured to generate a different waveform, or the DDS 320 may be configured to generate one of a plurality of waveforms selected by the sensor controller 250. The DAC 330 converts the digital output of the DDS 320 to the stimulus signal 335. The stimulus signal 335 is an analog waveform input to the impedance bridge 220.

The driver circuit 210 may include additional components to generate an antiphase signal (i.e., a signal having opposite phase of the stimulus signal 335) that is provided as a second input to the impedance bridge 220 in mutual-sensing mode. For example, the driver circuit 210 may include a delay element configured to receive either the digital waveform output by the DDS 320 or the analog waveform output by the DAC 330 and delay the received signal by 180°, generating an antiphase signal. The driver circuit 210 may have different configurations from the configuration shown in FIG. 3. For example, the driver circuit 210 may generate an analog waveform directly using a phase-locked loop (PLL).

The digital waveform 325 output by the DDS 320 and passed to the driver DAC 330 is also provided to the signal processing circuit 240. The signal processing circuit 240 performs a correlation of a digital output received from the amplifier circuit 230 with the digital waveform 325. The correlation process also demodulates the output from the amplifier circuit 130 into in-phase (I) and quadrature (Q) components 390. While in the example shown in FIG. 3 the correlation/demodulation process is performed in the digital domain, in other embodiments, the signal processing circuit 240 may receive the analog stimulus signal 335 from the driver circuit 210 and perform the correlation and demodulation in the analog domain.

More specifically, in the example shown in FIG. 3, the signal processing circuit 240 includes a delay element 340, a phase shifter 350, mixers 360, time domain windows 370, and accumulators 380. The delay element 340 delays the digital waveform 325 received from the DDS 320 to align the phase of the digital waveform 325 with the phase of the output of the amplifier circuit 230. The delay element 340 may be adjustable and calibrated for the device. In some embodiments, the delay setting of the delay element 340 may be adjusted based on the configuration of the impedance bridge 220 and/or amplifier circuit 230, as reconfiguring the impedance bridge 220 and amplifier circuit 230 may adjust the phase of the signal received from the amplifier circuit 230.

One copy of the digital waveform 325 delayed by the delay element 340 is passed to a first mixer 360*a*. Another copy of the delayed waveform is passed to a phase shifter 350 that shifts the phase of the delayed waveform by 90°. The 90° phase shift is used to obtain a quadrature component of the output signal.

The mixers 360*a* and 360*b* multiply their respective versions of the delayed digital waveform 325 with the output of the amplifier circuit 230. Delaying the digital waveform 325 and mixing the delayed waveform with the output of the amplifier circuit 230 correlates the output waveform to the input waveform. This has the effect of rejecting signals at frequencies other than the frequency of the digital waveform 325 and stimulus signal 335. For example, if the proximity sensor system 200 is incorporated into a smartphone, the frequency of the electronics running the screen may interfere with the proximity sensor system 200. The frequency of the waveform generated by the driver circuit 210 can be selected to be a different frequency from other device frequencies, such that the correlation process rejects signals at other frequencies in the output of the amplifier circuit 230.

The outputs of the mixers 360*a* and 360*b* are each passed through a respective one of the time domain windows 370*a* and 370*b*. The outputs of the time domain windows 370*a* and 370*b* are each coupled to a respective accumulator 380*a* and 380*b*, which generate the demodulated output, i.e., an I component 390*a* and a Q component 390*b*. The time domain windowing and accumulation sample the data for storage in memory and further processing by the sensor controller 250. The output signals 390*a* and 390*b* (referred to generally as the signal processing output 390) are passed to the sensor controller 250 for processing. The output signals 390*a* and 390*b* may be passed to the proximity detector 270, either directly or via the sensor controller 250, and the output signals 390*a* and 390*b* may be the measurements used for proximity detection.

Example Impedance Bridge

Figure 4:
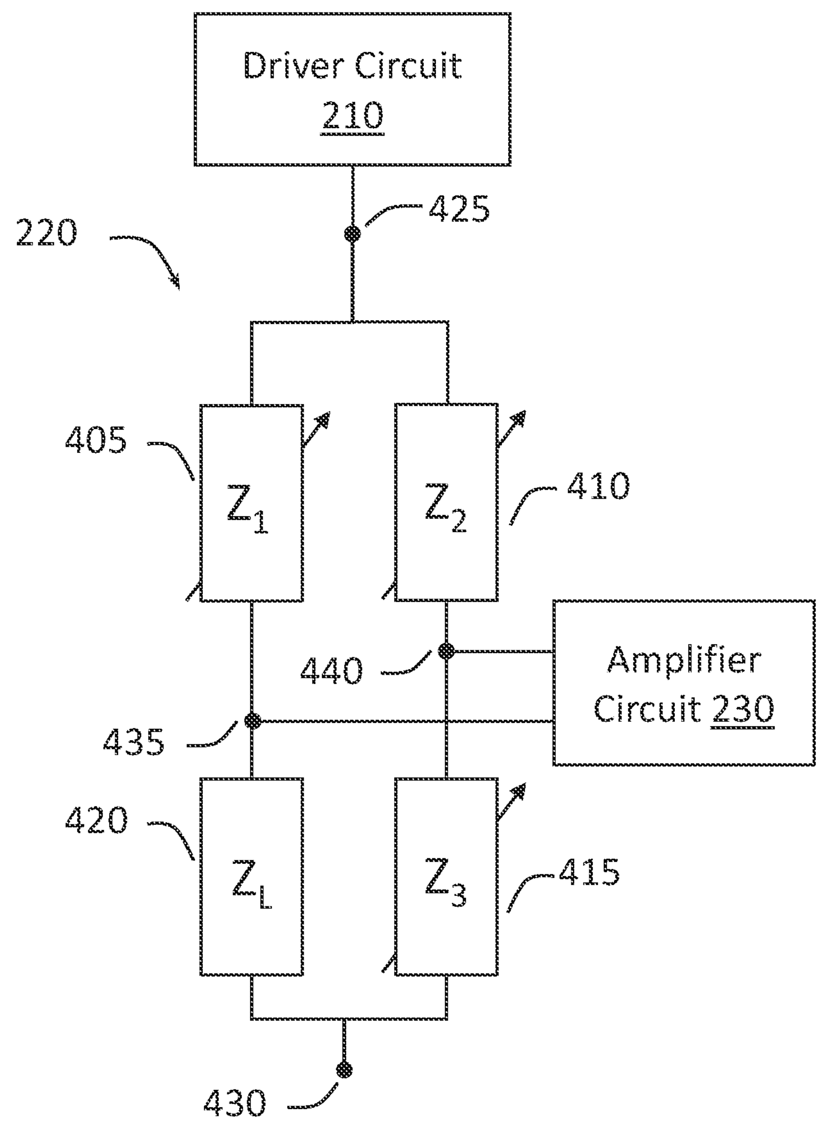
FIG. 4 is a block diagram of an example impedance bridge, according to some embodiments of the present disclosure.
Figure 6B:
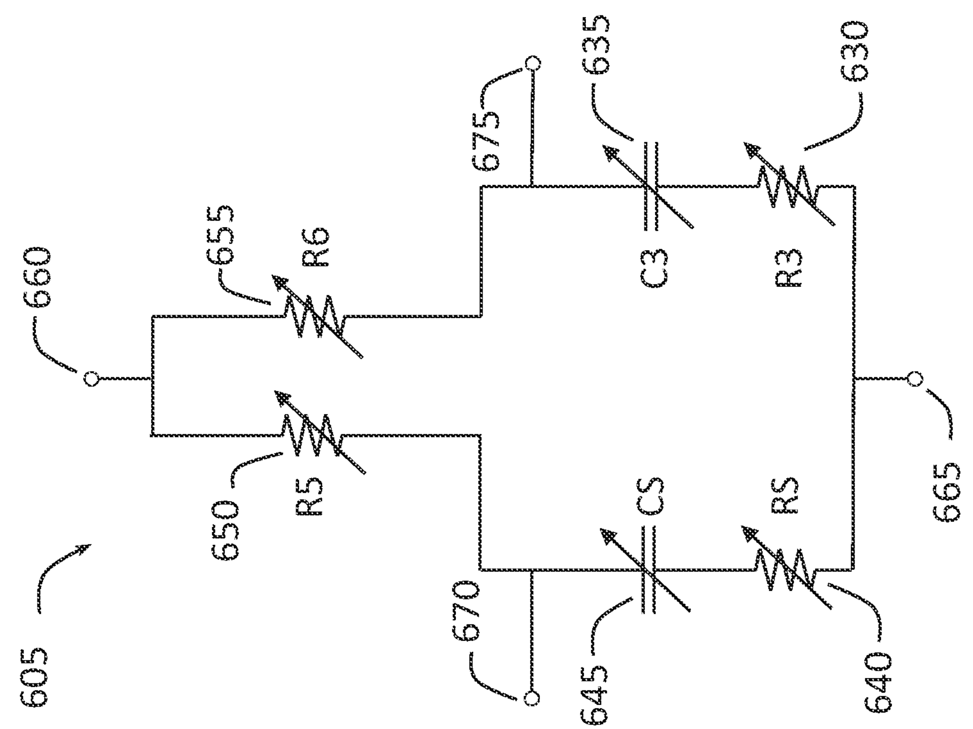
FIGS. 6A and 6B are circuit diagrams of an example impedance bridge, according to some embodiments of the present disclosure.
Figure 6A:
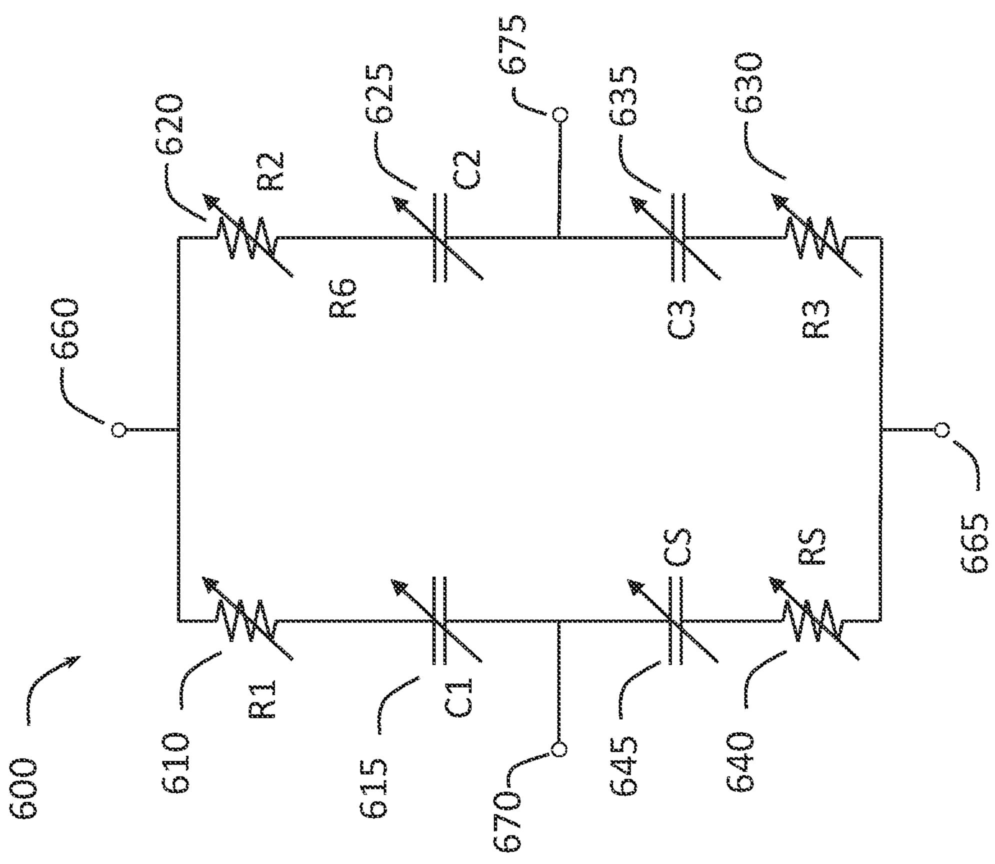

FIG. 4 is a block diagram of an example impedance bridge 220, according to some embodiments of the present disclosure. The impedance bridge 220 includes a first impedance element 405, a second impedance element 410, a third impedance element 415, and a coupling network 420. In this example, each of the first, second, and third impedance elements 405, 410, and 415 is a variable impedance element. Each impedance element 405, 410, and 415 may include one or more capacitors and/or one or more resistors. For example, each impedance element 405, 410, and 315 may include a variable capacitor and a variable resistor connected in series. Two example circuit implementations for the impedance elements 405, 410, and 415 are shown in FIGS. 6A and 6B.

Each of the first, second, and third impedance elements 405, 410, and 415 has a respective impedance $Z_1$, $Z_2$, and $Z_3$ that can be adjusted, e.g., by the sensor controller 250. For example, each impedance element 405, 410, and 415 includes a capacitor digital-to-analog converter (DAC), a programmable capacitor, or an adjustable capacitor having a set of possible capacitance settings, and a resistor DAC, a programmable resistor, or an adjustable resistor having a set of possible resistance settings. In some embodiments, one or more components of an impedance element may be bypassed, e.g., a resistor included in series with a capacitor may optionally be bypassed. In some embodiments, one or more of the impedance elements 405, 410, and 415 is fixed rather than variable. For example, for an impedance bridge 220 configured for a self-sensing mode, the third impedance element 415 may be fixed, and the first and second impedance elements 405 and 410 are variable. As another example, for an impedance bridge 220 configured for the mutual-sensing mode, both the second and third impedance elements 410 and 415 may be fixed, and the first impedance element 405 is variable. Having all three of the impedance elements 405, 410, and 415 be variable elements increases sensor size and complexity, but may also provide wider applicability, e.g., the ability to balance a wider range of offset impedances.

The coupling network 420 is a circuitry network within the impedance bridge 220 that is couplable to electrodes. In particular, the coupling network 420 couples the impedance bridge 220 to one sensing electrode to implement a self-sensing mode, and the coupling network 420 couples the impedance bridge 220 to two sensing electrodes to implement a mutual-sensing mode. The electrodes coupled to the coupling network 420 are referred to generally as a sensing impedance element. In some embodiments, the coupling network 420 includes one or more switches, e.g., a switching matrix, to switch between a set of sensing electrodes. The switching matrix may also ground electrodes that are not used for sensing. An example of a switching matrix is shown in FIG. 7. The electrodes coupled to the coupling network 420 may be located outside of the impedance bridge 220 and, in some embodiments, outside of the proximity sensor system 200. In other words, the coupling network 420 provides an electrical interface to couple the impedance bridge 220 to electrodes (e.g., the electrodes 102) included in a device (e.g., the device 100) in which the proximity sensor system 200 is integrated.

Figure 5:
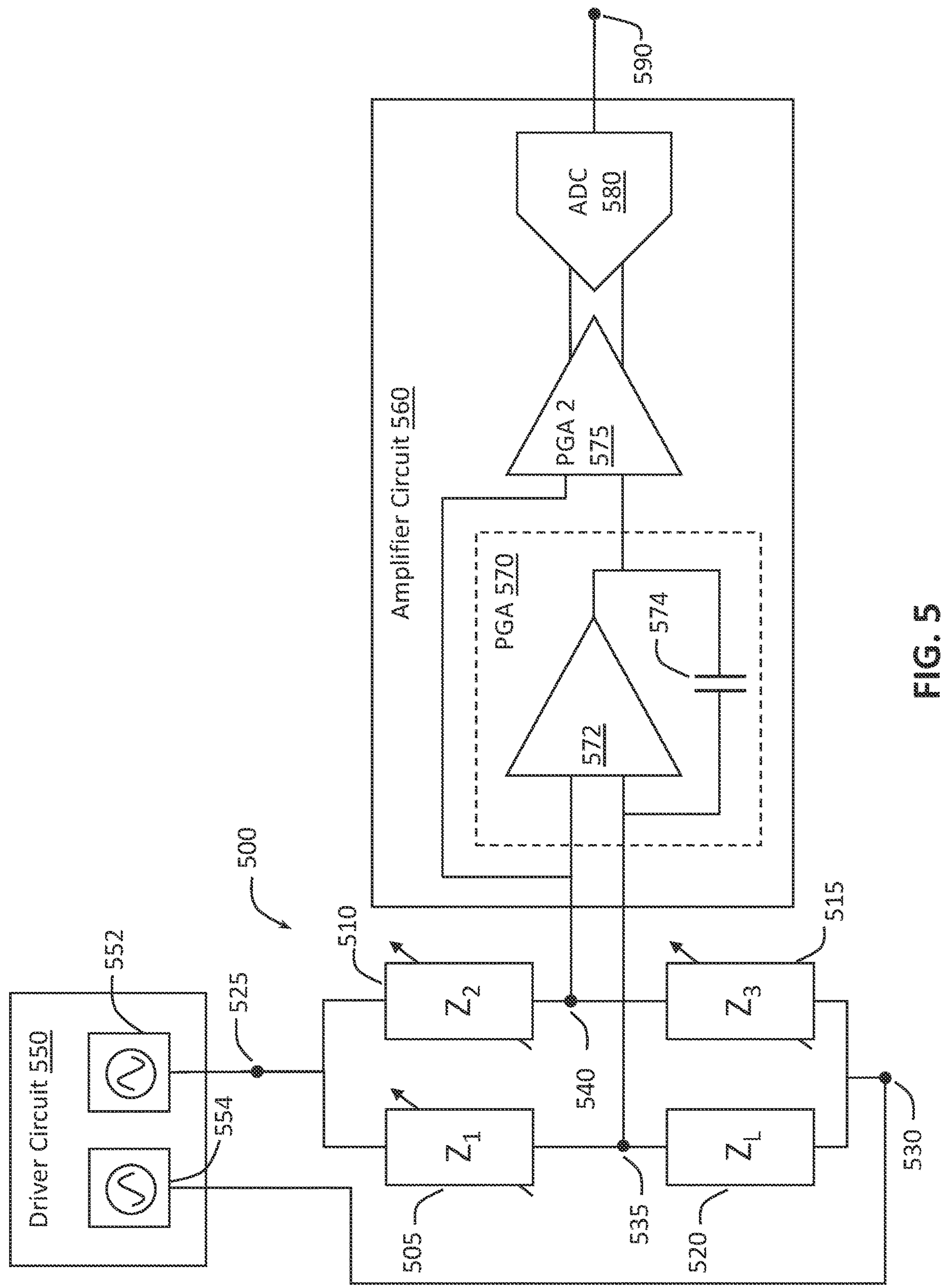
FIG. 5 is a block diagram of an impedance bridge and amplifier circuit arranged in a mutual-sensing mode, according to some embodiments of the present disclosure.

An input terminal 425, also referred to as a first input terminal 425, is coupled to the first impedance element 405 and the second impedance element 410. The first input terminal 425 is also coupled to the driver circuit 210 to apply the stimulus signal to the impedance bridge 220, and in particular, to apply the stimulus signal to the first impedance element 405 and the second impedance element 410. A second input terminal 430 is coupled to the third impedance element 415 and the coupling network 420. The second input terminal 430 is further coupled to the driver circuit 210, as shown in FIG. 5. In some implementations, the second input terminal 430 may be alternately coupled to a ground in a self-sensing mode. In some embodiments, the second input terminal 430 includes or can be coupled to a switch or set of switches for switching the second input terminal 430 to the driver circuit 210 in the mutual-sensing mode. The switch is controllable to switch the second input terminal 430 between the ground in the self-sensing mode and the driver circuit 210 in the mutual-sensing mode. An example of two switches coupled to the second input terminal 430 for switching between the mutual-sensing and self-sensing modes is shown in FIG. 7.

Two output terminals 435 and 440 couple the impedance bridge 220 to the amplifier circuit 230, which outputs a voltage related to an environmental characteristic sensed by the sensing impedance element. The first impedance element 405 is coupled between the input terminal 425 and a first output terminal 435. The second impedance element 410 is coupled between the input terminal 425 and a second output terminal 440. The third impedance element 415 is coupled between the second input terminal 430 and the second output terminal 440. The coupling network 420 is coupled between the second input terminal 430 and the first output terminal 435. In the mutual-sensing mode, the amplifier circuit 230 forces the voltage at first output terminal 435 to match the voltage at second output terminal 440, and converts the net input charge at the first output terminal 435 to a voltage; the difference between this voltage and the voltage at second output terminal 440 indicates an imbalance in the impedance bridge 220 caused by an environmental characteristic.

In operation, the environment around the sensing impedance element has an offset impedance load, referred to as $Z_L$. The offset impedance load may include a resistance component $R_L$ and a capacitance component $C_L$. The offset impedance load may be caused by other elements of the device implementing the proximity sensor system 200, such as metallic or di-electric materials in the region of the sensing impedance element. In some embodiments, the offset impedance load $Z_L$ may be different for different configurations, e.g., whether the proximity sensor system 200 is in mutual-sensing or self-sensing mode, or based on which electrodes are selected by the electrode switch 160. In some embodiments, the offset impedance load $Z_L$ for a particular device, or for a particular sensor configuration, is considered fixed. In other embodiments, the offset impedance load $Z_L$ may vary, e.g., based on device usage (e.g., whether certain components of the device are operating), environmental conditions (e.g., temperature, humidity), other device characteristics (e.g., whether the device is enclosed in a case), or other factors.

The impedance bridge 220 is balanced such that the offset impedance load $Z_L$ is offset by the impedances $Z_1$, $Z_2$, and $Z_3$ of the impedance elements 405, 410, and 415. In particular, setting a first ratio between the first impedance $Z_1$ and the offset impedance $Z_L$ equal to a second ratio between the second $Z_2$ and the third impedance $Z_3$ balances the impedance bridge 220. The sensor controller 250 may instruct the impedance bridge 220 to perform a calibration procedure to measure the offset impedance load (e.g., $R_S$ and $C_S$), and the sensor controller 250 sets one or more of the impedances $Z_1$, $Z_2$, and $Z_3$ according to the measured offset impedance load. The sensor controller 250 provides instructions to one or more of the impedance elements 405, 410, and 415, and in particular, to their constituent elements (e.g., variable capacitors and variable resistors) to adjust the impedances (e.g., some or all of $R_1$, $R_2$, and $R_3$; some or all of $C_1$, $C_2$, and $C_3$) to balance the offset impedance load $Z_L$.

More particularly, to balance the impedance bridge 220, the sensor controller 250 may determine the offset impedance $Z_L$ based on measurements obtained by the impedance bridge 220 or another sensor. The sensor controller 250 determines the first impedance $Z_1$ for the first impedance element 405 based on the offset impedance $Z_L$ and provides instructions to the first impedance element 405 to set it to the determined first impedance setting. For example, the sensor controller 250 adjusts the first impedance $Z_1$ to match or approximately match the offset impedance $Z_L$. The first impedance element $Z_1$ may have a finite number of impedance settings, and the sensor controller 250 selects the impedance setting that most closely matches the offset impedance $Z_L$. In another example, if the offset impedance $Z_L$ (e.g., the inverse of the offset capacitance $C_L$) is lower than the first impedance element 405 may be set to (e.g., the offset capacitance $C_L$ is higher than the highest capacitance setting in a programmable capacitor), the selected first impedance $Z_1$ is different from the offset impedance $Z_L$.

In some embodiments, only the first impedance $Z_1$ is variable, and the sensor controller 250 instructs the first impedance element 405 according to the selected first impedance $Z_1$ to balance the impedance bridge 220. In other embodiments, the second and/or third impedances $Z_2$ and $Z_3$ are also variable. In such embodiments, the sensor controller 250 selects the second and/or third impedances $Z_2$ and $Z_3$ based on the offset impedance $Z_L$ and the selected first impedance $Z_1$. The sensor controller 250 selects the second and/or third impedances $Z_2$ and $Z_3$ such that the first ratio $Z_1/Z_L$ is equal to the second ratio $Z_2/Z_3$. In one example, the first, second, and third impedances $Z_1$, $Z_2$, and $Z_3$ are all set equal or approximately equal to $Z_L$. In another example, the first impedance $Z_1$ is set equal or approximately equal to $Z_L$, and the second and third impedances $Z_2$ and $Z_3$ are equal to each other but not equal to $Z_L$, e.g., $Z_2$ and $Z_3$ are less than $Z_1$. In still another example, the first impedance $Z_1$ is less than $Z_L$, and the second impedance $Z_2$ is less than the third impedance $Z_3$. The second impedance $Z_2$ may also be less than the first impedance $Z_1$, and the third impedance $Z_3$ less than the offset impedance $Z_L$, to balance an offset load that is greater than highest impedance setting of the impedance elements 405, 410, and 415.

Example Impedance Bridge Configured for Mutual-Sensing Mode

FIG. 5 is a block diagram of an impedance bridge 500, driver circuit 550, and amplifier circuit 560 configured in a mutual-sensing mode, according to some embodiments of the present disclosure. The impedance bridge 500 is an example of the impedance bridge 220 described with respect to FIGS. 2-4. A first input terminal 525 couples the impedance bridge 220 (particularly, the first impedance element 505 and the second impedance element 510) to a driver circuit 550, which is an example of the driver circuit 210 described with respect to FIGS. 2 and 3. The driver circuit 550 generates two signals, a first signal 552 and a second signal 554 that has an opposite phase of the first signal 552. The first signal 552 and second signal 554 are also referred to as phase and antiphase signals. The first signal 552 is provided to the input terminal 525. The second signal 554 is provided to a second input terminal 530, which is coupled to a coupling network 520 and a third impedance element 515. The coupling network 520 is coupled to two or more sensing electrodes, as described with respect to FIG. 7.

A first output terminal 535 is coupled between the first impedance element 505 and the coupling network 520, and a second output terminal 540 is coupled between the second impedance element 510 and the third impedance element 515. The first output terminal 535 and second output terminal 540 are further coupled to an amplifier circuit 560, which is an example of the amplifier circuit 230. The third impedance element 515 is coupled between the second output terminal 540 and the second input terminal 530, and the coupling network 520 is coupled between the first output terminal 535 and the second input terminal 530. When the impedance bridge 500 is balanced, the opposing stimulus signals 552 and 554 cancel out at the output terminals 535 and 540. A DC offset voltage may be applied to output terminals 535 and 540 to set these to fixed voltage. A change in the environment around the electrodes coupled to the coupling network 520 changes the charge level at the output terminal 535.

The amplifier circuit 560 includes two PGAs 570 and 575. Each PGA 570 and 575 may have an adjustable gain, and the sensor controller 250 selects a gain setting and instructs the amplifier circuit 560 to adjust the gains of the PGAs 570 and 575 accordingly. The first PGA 570 includes an amplifier 572 and a feedback capacitor 574 coupled to the output of the amplifier 572. The feedback capacitor 574 is also connected to the input of the amplifier 572 that is connected to the first output terminal 535. The first PGA 570 forces the voltage at the first output terminal 535 to match the voltage at the second output terminal 540 and converts a net charge due to an imbalance in the impedance bridge 500 to an output voltage. The feedback capacitor 574 may be a variable capacitor, and its capacitance can be set by the sensor controller 250 based on the capacitance response across the electrodes coupled to the coupling network 520. Reducing the capacitance of the feedback capacitor 574 reduces the noise in the measured impedance but also reduces the range of impedance loads the sensor system can measure, while a higher capacitance setting for the feedback capacitor 574 increases the measurement range but also may increase the noise in the impedance measurement. If the capacitance response across the electrodes coupled to the coupling network 520 has a relatively large amount of variation, the feedback capacitor 574 may saturate, increasing the noise in the resulting output signal. Therefore, when variation in capacitance across the electrodes coupled to the coupling network 520 is greater, the sensor controller 250 may select greater capacitance setting for the feedback capacitor 574.

The second PGA 575 has a first input coupled to the second output terminal 540 and a second input that is coupled to the output of the first PGA 570. The second PGA 575 amplifies a difference between the voltage at the second output terminal 540 and the output voltage of the PGA 570. The two outputs of the second PGA 575 are coupled to inputs of an ADC 580. The ADC 580 converts the amplified difference signal to a digital output 590. The digital output 590 is coupled to a signal processing circuit, e.g., the signal processing circuit 240 shown in FIGS. 2 and 3. In other embodiments, the ADC 580 is omitted, and the amplifier circuit 560 provides an analog output signal to the signal processing circuit 240.

In some embodiments, the sensor system shown in FIG. 5 can be reconfigured in a self-sensing mode. The second input terminal 530 may include a switch or switches to either couple the impedance bridge to the driver circuit, as shown in FIG. 5, or alternatively to couple the impedance bridge to a ground; an example switches are shown in FIG. 7. The amplifier circuit 230 may also include switchable connections between the PGAs so that the second PGA 575 can receive inputs from the impedance bridge 220 and the first PGA 570, as shown in FIG. 5, or so that the second PGA 575 can be coupled to two outputs of the first PGA 570 in a self-sensing mode. The sensor controller 250 provides instructions to the switch(es) at the second input terminal and instructions to the amplifier circuit to configure the proximity sensor system 200 in either of the modes. In some other embodiments, the amplifier circuit 230 includes two different amplifier circuits (one for a self-sensing mode, and the amplifier circuit 560 for the mutual-sensing mode), and the sensor controller 250 selects one of the amplifier circuits and couples the selected amplifier circuit to the impedance bridge 220 and signal processing circuit 240 based on the selected sensing mode.

Example Impedance Bridge Circuit Diagram

FIGS. 6A and 6B show two circuit diagrams of two circuit configurations 600 and 605 of an example impedance bridge, according to some embodiments of the present disclosure. The circuit diagrams shown in FIGS. 6A and 6B may be two configurations of the impedance bridges 220 and 500 described with respect to FIGS. 2-5. In some embodiments, the impedance bridge 220 may alternate between the configurations shown in FIGS. 6A and 6B. The first configuration 600 is referred to as a capacitor bridge configuration, and the second configuration 605 is referred to as a resistor pullup configuration.

The first configuration 600 includes a first resistor 610 and a first capacitor 615 connected in series and coupled between a first input terminal 660 and a first output terminal 670. The first resistor 610 and first capacitor 615 are an example of the first impedance elements 405 and 505 shown in FIGS. 4 and 5. The first configuration 600 includes a second resistor 620 and a second capacitor 625 connected in series and coupled between the first input terminal 660 and a second output terminal 675. The second resistor 620 and second capacitor 625 are an example of the second impedance elements 410 and 510 shown in FIGS. 4 and 5. The first configuration 600 includes a third resistor 630 and a third capacitor 635 connected in series and coupled between a second input terminal 665 and the second output terminal 675. The third resistor 630 and third capacitor 635 are an example of the third impedance elements 415 and 515 shown in FIGS. 4 and 5. In this example, each of the resistors 610, 620, and 630 is a variable resistor; their respective resistances R1, R2, and R3 may be set by the sensor controller 250.

Each of the capacitors 615, 625, and 635 is a variable capacitor; their respective capacitances C1, C2, and C3 may be set by the sensor controller 250. As noted above, in some implementations, one or more of the resistors 610, 620, and 630 and/or capacitors 615, 625, and 635 may be fixed.

The first configuration 600 further includes a sensed resistance 640 and a sensed capacitance 645. The sensed resistance 640 and sensed capacitance 645 are models of the resistance and capacitance across the electrodes coupled to the coupling network. The sensed resistance 640 and sensed capacitance 645 may have an offset component, i.e., the offset impedance load described with respect to FIGS. 2-5. The sensed resistance 640 and sensed capacitance 645 may also have a load that varies based on environmental conditions, such as a tissue sample, a finger, or another material in the environment of the electrode(s).

FIG. 6B shows a second configuration 605 of an example impedance bridge. In the second configuration 605, the first and second series resistors 610 and 620 and first and second series capacitors 615 and 625 have been replaced with two pullup resistors 650 and 655. The pullup resistors 650 and 655 enable measurement of a small change in capacitance when the offset capacitance is large.

The impedance bridge 220 may be able to alternate between the first configuration 600 and second configuration 605. In one embodiment, the first and fifth resistors 610 and 650 are the same, and the second and sixth resistors 620 and 655 are the same; the impedance bridge 220 switches from the first configuration 600 to the second configuration 605 by bypassing the capacitors 615 and 625. Alternatively, the impedance bridge may include one pair of pathways between the terminals 670 and 660 and another pair of pathways between the terminals 675 and 660, and switches to select one pathway of each of the pair of pathways. In some embodiments, the impedance bridge may be configured so that the circuit simultaneously includes both pathways between the terminals 670 and 660 and both pathways between the terminals 675 and 660, i.e., the pathways including the first and second resistors 610 and 620 and first and second capacitors 615 and 625, as well as the pathways including the fifth and sixth resistors 650 and 655, with the fifth and sixth resistors connected in parallel to the first and second resistors 610 and 620 and the first and second capacitors 615 and 625.

The resistor pullup configuration 605 shown in FIG. 6B is useful for measuring loads with large offset capacitance. When the available capacitance on the impedance bridge is less than the offset capacitance (e.g., the offset load has a greater capacitance than the largest available capacitance setting for $C_1$), the resistor pullup configuration 605 can be used to achieve a better signal-to-noise ratio than may be achieved with the capacitor bridge configuration 600, so the sensor controller 250 may select the resistor pullup configuration 605. On the other hand, when the offset capacitance is less than the available capacitance on the impedance bridge, the capacitor bridge configuration 600 may provide better signal-to-noise ratio than the resistor pullup configuration 605, so the sensor controller 250 may select the capacitor bridge configuration 600. While the impedance bridge may be designed with larger on-chip capacitances to improve signal-to-noise ratio for larger loads, this also increases the amount of the die dedicated to the on-chip capacitors, and may increase the size of the chip. Implementing a resistor pullup configuration 605 can be used to improve noise performance at high loads without constraining chip area or increasing chip size.

Example Device With Impedance Bridge Sensor

FIG. 7 is a block diagram of an example implementation of a sensor system 700 implemented in a device 760 and configured in a mutual-sensing mode, according to some embodiments of the present disclosure. The sensor system 700 is an example of the proximity sensor system 200, and more particularly, an example of the mutual-mode sensor system shown in FIG. 5. The sensor system 700 includes an impedance bridge having three impedance elements 705, 710, and 715 and a switch matrix 720, which is an example implementation of a coupling network 420. A first input terminal 725 is coupled to a driver circuit 750, which is an example of the driver circuit 210. A second input terminal 730 is also coupled to the driver circuit 750. The second input terminal 730 is coupled to a first switch 732 configurable to couple the third impedance element 715 to the driver circuit 750. The second input terminal 730 is also coupled to a second switch 734 configurable to couple the switch matrix 720 to the driver circuit 750. In the mutual-sensing mode shown in FIG. 7, the switches 732 and 734 are configured to couple the third impedance element 715 and switch matrix 720, respectively, to the second input terminal 730 and thus to the driver circuit 750. If the sensor system 700 can alternately be configured in a self-sensing mode, the switch 732 couples the third impedance element 715 to a ground element, VSS 755, and the switch 734 floats the lower terminal of the switch matrix 720.

The driver circuit 750 generates a first stimulus signal 752 and second stimulus signal 754 having opposite phase of the first stimulus signal 752. The first stimulus signal 752 is coupled to the first input terminal 725, and the second stimulus signal 754 is coupled to the second input terminal 730. The second stimulus signal 754 is applied to the switch matrix 720 and third impedance element 715 based on the configurations of the switches 734 and 732. The impedance bridge has two outputs 735 and 740, which are connected to an amplifier circuit (e.g., amplifier circuit 230 or 560) not shown in FIG. 7. In addition to the amplifier circuit, the sensor system 700 may further include a signal processing circuit (e.g., signal processing circuit 240), control circuitry (e.g., sensor controller 250), and a proximity detector (e.g., proximity detector 270).

The switch matrix 720 is couplable to electrodes on the device 760. In this example, the device 760 includes four electrodes 765-1, 765-2, 765-3, and 765-4 arranged near the corners of the device 760; these may be sensing electrodes. The device 760 may further include one or more additional sensing electrodes (e.g., a central sensing electrode, as shown in FIG. 1), and/or one or more ground electrodes. The device 760 may have other electrode configurations, such as the configurations illustrated in FIG. 8. The device 760 may include any number of sensing electrodes 765 and any number of ground electrodes 770. In this example, the sensor system 700 includes pins IN1, IN2, IN3, and IN4 for coupling to the electrodes 765 on the device 760. For example, the first electrode 765-1 is coupled to a first input pin IN1 on the sensor system 700 via connection 780-1. The first input pin IN1 is coupled to an input of the switch matrix 720. Note that while FIG. 7 depicts the sensor system 700 as being outside of the device 760, it should be understood that the sensor system 700 may be integrated into the device 760 as a component or subsystem of the device 760.

The switch matrix 720 includes circuitry for coupling the first output terminal 735 and the second input terminal 730 to electrodes 765 of the device 760. In the example shown in FIG. 7, the switch matrix 720 selects the second sensing electrode 765-2 and the third sensing electrode 765-3, as indicated by the heavier connection lines 780-2 and 780-3, e.g., the switch matrix 720 couples the first output terminal 735 to the second electrode 765-2 and the second input terminal 730 to the third electrode 765-3, or vice versa. In some embodiments, the switch matrix 720 further couples any unused sensing electrodes (here, the first and fourth electrodes 765-1 and 765-4) to the VSS 755 to ground the unused sensing electrodes. The switch matrix 720 may alternately be set to couple the first output terminal 735 and second input terminal 730 to any pair of electrodes 765. The switch settings may be determined by the sensor controller 250, which transmits configuration instructions to the electrode switch matrix 720 and the switches 732 and 734. In this configuration, the output of the impedance bridge is correlated to a change in capacitance between the selected electrodes 765-2 and 765-3 and on the right side of the device 760. This is represented by the sensed capacitance 790 between the selected electrodes 765-2 and 765-3. At least a portion of the electric field between the electrodes 765-2 and 765-3 extends outside of the device 760 and is able to sense changes in the environment outside of the device 760.

In some embodiments, the switch matrix 720 may couple the first output terminal 735 and/or second input terminal 730 to multiple electrodes 765. For example, if the device 760 includes a first pair of electrodes on one side of a device (e.g., 765-1 and 765-4) and a second pair of electrodes on another side of the device (e.g., 765-2 and 765-3), the switch matrix 720 may couple the first pair of electrodes to the first output terminal 735 and the second pair of electrodes to the second input terminal 730. This may enable the sensor system 700 to obtain an impedance measurement across a larger region.

The sensor controller 250 may instruct the switch matrix 720 to cycle through a series of different configurations and obtain a sequence of measurements, e.g., measurements from different combinations of electrodes. In some embodiments, the sensor controller 250 may instruct the switch matrix 720 and switches 734 and 732 to cycle through measurements in different modes. As one example, the sensor controller 2250 instructs the proximity sensor system 200 to obtain a sequence of mutual-mode measurements using different combinations of the sensing electrodes 765 (e.g., a first measurement between the electrodes 765-1 and 765-4 followed by a second measurement between the electrodes 765-2 and 765-3). As another example, the sensor controller 250 instructs the proximity sensor system 200 to obtain sequence of self-mode measurements using each of the sensing electrodes 765 in series (e.g., a first measurement using the first sensing electrode 765-1, a second measurement using the second sensing electrode 765-2, etc.). The sensor controller 250 may switch back and forth between self-sensing and mutual-sensing modes and obtain measurements in each mode. The sensor controller 250 may adjust one or more of the impedance settings Z1, Z2, and Z3 based on the selected electrode(s) and selected mode to account for different offset impedances. In some embodiments, the sensor controller 250 further instructs the driver circuit 210 to generate different signal frequencies and/or amplitudes for different measurements. For example, the sensor controller 250 instructs the electrode switch matrix 720 to select the first and fourth electrodes 765-1 and 765-4 and obtains a series of measurements at a set of different stimulus frequencies; the sensor controller 250 then instructs the electrode switch matrix 720 to select the second and third electrodes 765-2 and 765-3 and obtains a series of measurements at the set of stimulus frequencies, etc. Various combinations of sensing mode, electrode selection, frequency selection, and amplitude selection are possible.

Alternative Electrode Layouts for Proximity Sensor System

FIGS. 8A-8D illustrate additional example electrode layouts for a proximity detection system, according to some embodiments of the present disclosure. As noted above, the example electrode geometries and electrode layouts shown in FIGS. 1 and 7 are exemplary, and other electrode geometries and/or electrode layouts may be used.

Figure 8A:
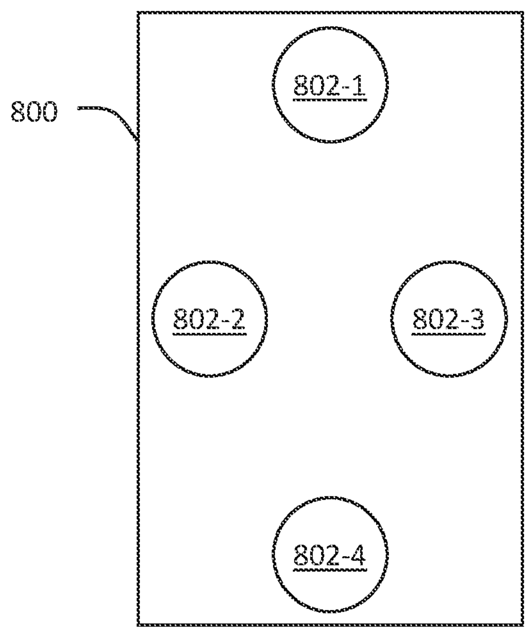
FIGS. 8A-8D illustrate additional example electrode layouts for a proximity detection system, according to some embodiments of the present disclosure.

FIG. 8A illustrates a device 800 having four electrodes 802 at different positions along the face of the device 800. Each of the electrodes 802 is located near a center of an edge of the face of the device 800. For example, the electrode 802-1 is located along the top edge of the device 800, and the electrode 802-2 is located along the left edge of the device 800. As illustrated, the electrodes 802 may be slightly offset from the edges, e.g., in the range of 0-10 millimeters. The electrodes 802 depicted in FIG. 8A are circular, but in other embodiments may have different geometries, e.g., ovals, squares, or rectangles (as illustrated in FIG. 8C).

The impedance sensor obtains sets of measurements between various subsets of the electrodes 802. Different subsets of electrodes 802 may be selected to detect objects in different positions or directions relative to the device 800. For example, two pairs of electrodes (802-1 and 802-2; 802-2 and 802-4) generate electric fields on a left side of the face of the device 800; these two pairs may be used to detect objects near the left side of the device 800. Another two pairs of electrodes (802-1 and 802-3; 802-3 and 802-4) generate electric fields on a right side of the face of the device 800; these two pairs may be used to detect objects near the right side of the device 800. If measurements from each of the four pairs indicates a change in capacitance, the proximity detection system may output a front-facing proximity detection signal. If measurements from one side (e.g., both of the right-side pairs) but not measurements from the other side (e.g., neither of the left-side pairs) indicate a change in capacitance, the proximity detection system may output a side proximity detection (in this example, a right-side proximity detection). As another example, the impedance sensor may obtain a set of measurements between the top and bottom electrodes (802-1 and 802-4) and a set of measurements between the left and right electrodes (802-3 and 802-3). If both of the top-bottom and left-right measurement sets indicate a change in capacitance, the proximity detection system may output a detection signal.

Figure 8B:
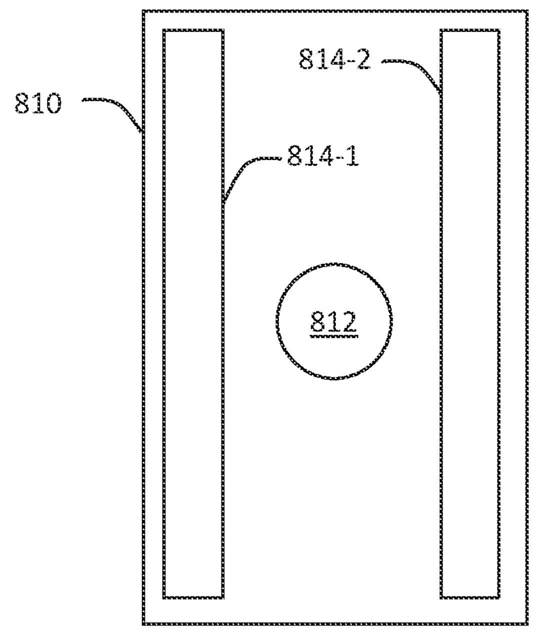
Figure 8C:
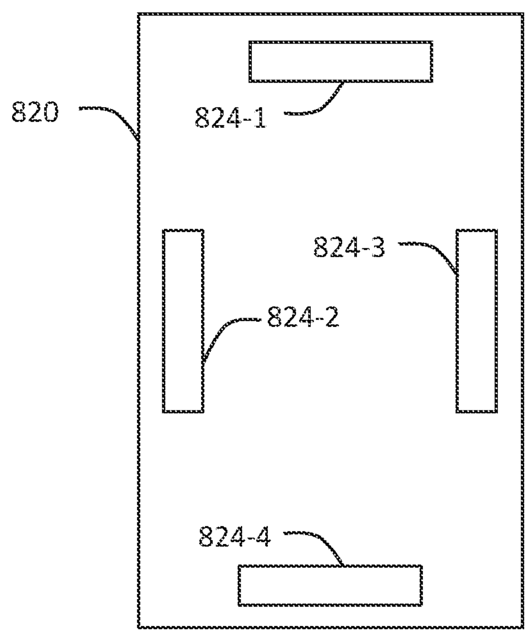

FIG. 8B illustrates a device 810 having two elongated side electrodes 814-1 and 814-2 and a central electrode 812. The two side electrodes 814-1 and 814-2 extend along the left side and right side of the device 810, respectively. The central electrode 812 has a smaller surface area than the side electrodes 814. In other examples, the electrodes 812 and 814 may have different geometries or sizes from the illustrated geometries and sizes, e.g., the electrodes 814 may be longer or shorter, the electrodes 814 may be rounded or ovular, the electrode 812 may be a square, rectangle, or oval, etc.

The impedance sensor may obtain sets of measurements between multiple subsets of the electrodes 812, 814-1 and 814-2. For example, the electrodes 814-1 and 812 generate an electric field on a left side of the face of the device 810, and may be used to detect objects near the left side of the device 810, while the electrodes 812 and 814-2 generate an electric field on a right side of the face of the device 810, and may be used to detect objects near the right side of the device 810. If measurements from each of these pairs indicates a change in capacitance, the proximity detection system may output a front-facing proximity detection signal.

FIG. 8C illustrates a device 820 having four elongated electrodes 824 at different positions along the face of the device 820. Each of the electrodes 824 is located along an edge of the face of the device 820. For example, the electrode 824-1 is located along the top edge of the device 820, and the electrode 824-2 is located along the left edge of the device 820. As illustrated, the electrodes 824 may be slightly offset from the edges, e.g., in the range of 0-10 millimeters. The electrodes 824 depicted in FIG. 8C are rectangular. The impedance sensor obtains sets of measurements between various subsets of the electrodes 824. Different subsets of electrodes 824 may be selected to detect objects in different positions or directions relative to the device 820. For example, the electrodes 824 may be paired in a similar manner to the electrodes 802 described with respect to FIG. 8A.

Figure 8D:
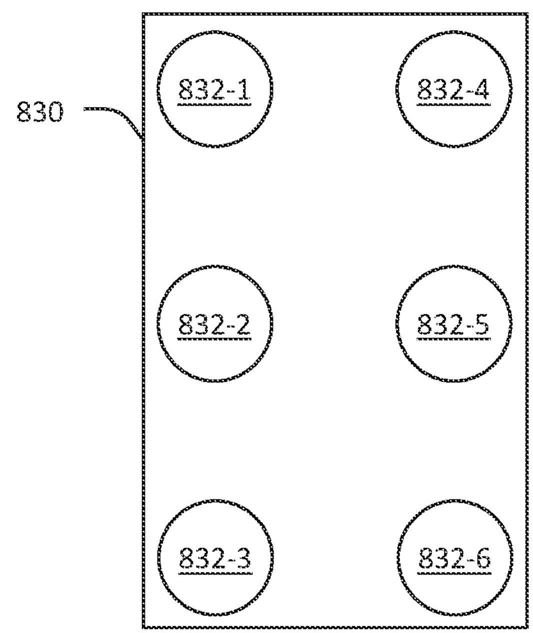

FIG. 8D illustrates a device 830 having six electrodes 832 at different positions along the face of the device 830. Four of the electrodes 832-1, 832-3, 832-4, and 832-6 are located near the four corners of the face of the device 830. The electrodes 832-2 and 832-5 are located near the centers of the left and right edges, respectively, of the face of the device 830. As illustrated, the electrodes 832 may be slightly offset from the edges, e.g., in the range of 0-10 millimeters. The electrodes 832 depicted in FIG. 8D are circular, but in other embodiments may have different geometries, e.g., ovals, squares, or rectangles.

The impedance sensor obtains sets of measurements between various subsets of the electrodes 832. Different subsets of electrodes 832 may be selected to detect objects in different positions or directions relative to the device 830. For example, two pairs of electrodes (832-1 and 832-2; 832-2 and 832-3) generate electric fields on a left side of the face of the device 800; these two pairs may be used to detect objects near the left side of the device 830. Another two pairs of electrodes (832-4 and 832-5; 832-5 and 832-6) generate electric fields on a right side of the face of the device 830; these two pairs may be used to detect objects near the right side of the device 830. If measurements from each of these pairs indicates a change in capacitance, the proximity detection system may output a front-facing proximity detection signal. If measurements from one side (e.g., both of the right-side pairs) but not measurements from the other side (e.g., neither of the left-side pairs) indicate a change in capacitance, the proximity detection system may output a side proximity detection (in this example, a right side proximity detection). As another example, the impedance sensor may obtain a set of measurements between the two top electrodes (832-1 and 832-4) and a set of measurements between the two bottom electrodes (832-3 and 832-6) for top proximity or bottom proximity detection. As still another example, the impedance sensor may use multiple side-to-side measurements, e.g., between the top electrodes (832-1 and 832-4), middle electrodes (832-2 and 832-5), and bottom electrodes (832-3 and 832-6) to perform front-facing proximity detection.

Methods for Using Sensor System

Figure 9:
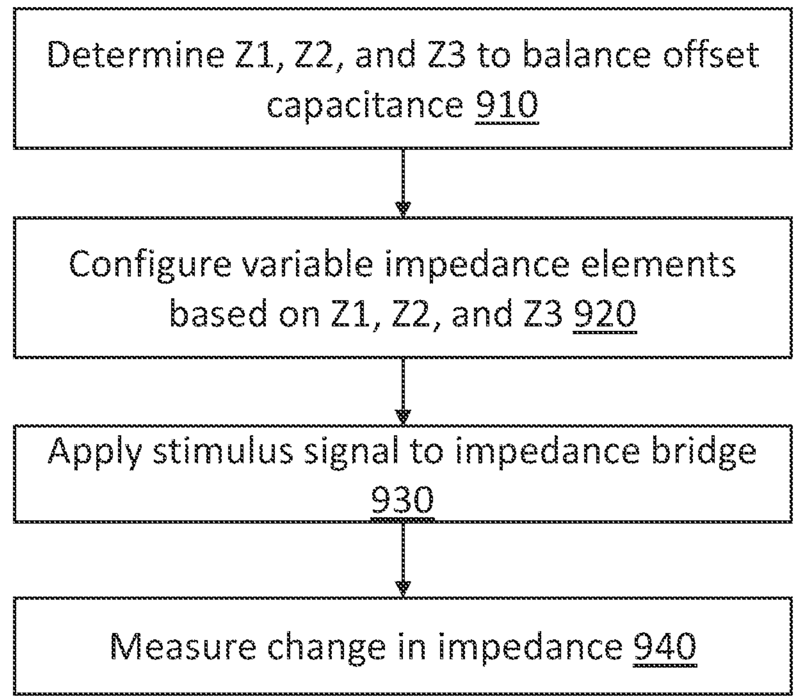
FIG. 9 provides a method for sensing a change in impedance using a sensor system, according to some embodiments of the present disclosure.

FIG. 9 provides a method for sensing a change in impedance using the sensor system, according to some embodiments of the present disclosure. Circuitry, e.g., the sensor controller 250, determines 910 impedance settings Z1, Z2, and Z3 for the impedance elements 405, 410, and 415 to balance an offset capacitance on the sensor, e.g., on a selected electrode or across a selected pair of electrodes. In some embodiments, one or more of the impedance elements are fixed, and the circuitry determines impedance settings for the variable elements, e.g., the circuitry determines a first impedance Z1 for the first impedance element 405 based on the offset impedance, the second impedance Z2, and the third impedance Z3.

The circuitry configures 920 the variable impedance elements based on the selected impedances. For example, the circuitry transmits instructions to adjust a variable capacitor included in the first impedance element 405 to set the capacitance to a determined capacitance.

A driver circuit, e.g., the driver circuit 210, applies 930 a stimulus signal to the impedance bridge. The driver circuit 210 may generate the stimulus signal at a particular frequency or amplitude at the instruction of the circuitry. In some embodiments, the driver circuit 210 generates and applies two stimulus signals having opposite phases to opposite sides of the impedance bridge, as described above.

The circuitry receives an output of the impedance bridge via a pair of output terminals and measures 940 a change in impedance caused by a change in an environment of the electrode or electrodes. For example, the amplifier circuit 230 and signal processing circuit 240 generate a demodulated and digitized output signal to the sensor controller 250, which can determine a change in impedance relative to the offset impedance based on the output signal. The sensor controller 250 may compare the impedance measurement to the offset impedance to determine a change relative to a baseline. The sensor controller 250 may also monitor changes in a series of impedance measurements taken over a period of time, e.g., as a sensed impedance changes while a user's finger is moving towards the selected electrode(s).

Figure 10:
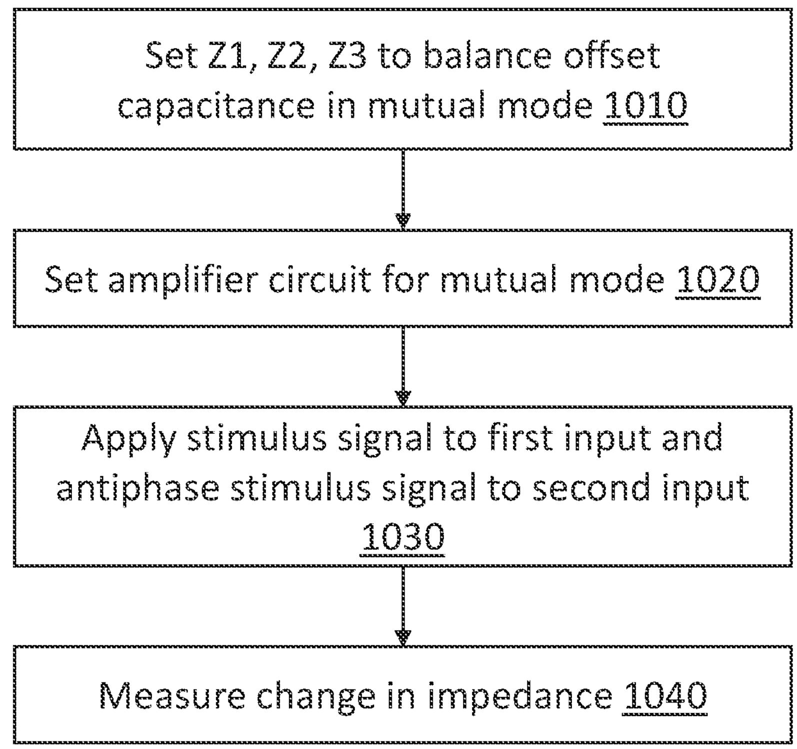
FIG. 10 provides a method for using a sensor system in a mutual-sensing mode, according to some embodiments of the present disclosure.

FIG. 10 provides a method for using an impedance sensor in a mutual-sensing mode, according to some embodiments of the present disclosure. The sensor, e.g., the sensor controller 250, sets 1010 impedances Z1, Z2, and Z3 to balance an offset impedance in mutual-sensing mode. In particular, the sensor controller 250 sets one or more of the impedances Z1, Z2, and Z3 for a particular set of electrodes configured for the mutual-sensing mode. The sensor, e.g., the sensor controller 250, further sets 1020 the configuration of the amplifier circuit 230 for mutual-sensing mode, e.g., in the configuration shown in FIG. 5. The sensor, e.g., the driver circuit 210, applies 1030 a stimulus signal (e.g., the stimulus signal 552 or 752) to a first input to the impedance bridge (e.g., to the first input terminal 525 or 725) and an antiphase stimulus signal (e.g., the stimulus signal 554 or 754) to a second input to the impedance bridge (e.g., to the second input terminal 530 or 730). The sensor measures 1040 a change in impedance across the electrodes coupled to the coupling network of the impedance bridge. For example, the impedance measurement obtained by the sensor controller 250 based on the output of the signal processing circuit 240 indicates a change in impedance relative to the offset impedance.

Method for Proximity Detection

Figure 11:
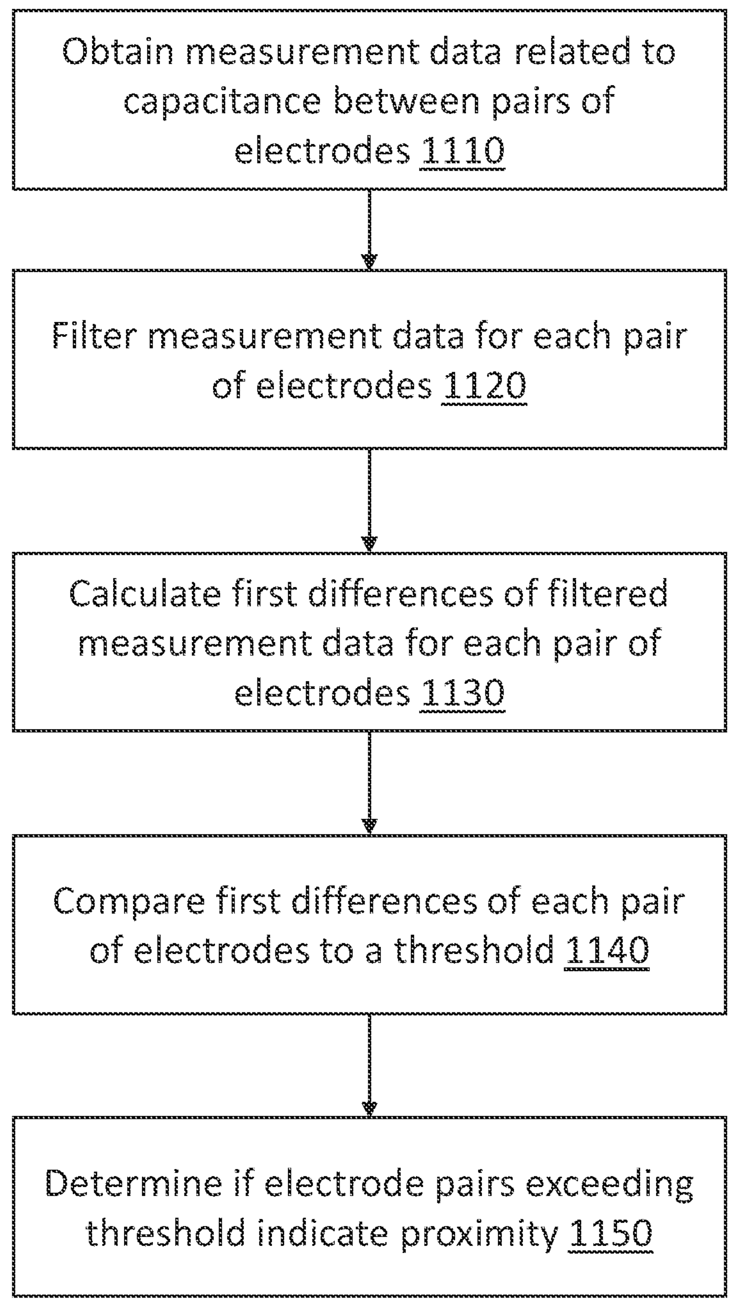
FIG. 11 provides a method for proximity detection, according to some embodiments of the present disclosure.

FIG. 11 provides a method for proximity detection, according to some embodiments of the present disclosure. A proximity detection system (e.g., the proximity sensor 104, which may include the impedance bridge 220 and other components shown in FIG. 2) obtains 1110 measurement data related to capacitance between multiple pairs of electrodes. As described above, the proximity detection system includes or is coupled to multiple electrodes (e.g., three or more electrodes) near a face of a device. The proximity detection system may obtain multiple sets of measurements from multiple subsets of electrodes, e.g., multiple pairs of the electrodes 102 or electrodes 765, by cycling through different electrode pairs using a switch matrix, such as the switch matrix 720. The sensor may pass the measurement data to a proximity detector, e.g., the proximity detector 270.

A proximity detector (e.g., the proximity detector 270) filters 1120 the measurement data for each pair of electrodes. For example, the proximity detector 270 may apply a noise filter to the measurement data for each pair of electrodes, as described with respect to FIG. 2.

The proximity detector calculates 1130 first differences of the filtered measurement data for each pair of electrodes. As described with respect to FIG. 2, this may be referred to as a FD estimator.

The proximity detector compares 1140 the first differences calculated for each pair of electrodes to a threshold. The proximity detector 270 may compare each first difference (for each electrode pair) to the same threshold or to different thresholds. The threshold(s) may be set based on an initial calibration of the device 100. If the FD estimator for a particular electrode pair exceeds its threshold, this indicates a change in capacitance between that electrode pair, which may correspond to an object approaching the electrodes and, more particularly, moving into the electric field between the electrode pair.

The proximity detector determines 1150 if the electrode pairs that exceed the threshold (i.e., the electrode pairs for which a detection was observed) indicate a proximity detection for the device 100. For example, the proximity detector 270 may apply one or more rules to the electrode pairs to determine whether front-facing proximity is observed, e.g., whether a detection is observed on two sides of the device 100, or whether detection is observed between each pair of electrodes for which measurements are obtained. The proximity detector 270 may determine other types of proximity in addition to or instead of front-facing proximity, e.g., proximity towards a side of the device 100. As described with respect to FIG. 2, the proximity detector 270 may perform detection smoothing to reduce noise in the detection signal.

Select Examples

Example 1 provides proximity sensor system including a sensor and a proximity detector, where the sensor is couplable to a plurality of electrodes, each of the plurality of electrodes at a different position on a face of a device, the sensor is further to obtain a first set of measurements between a first subset of the plurality of electrodes, the first set of measurements related to capacitance between the first subset of the electrodes; and obtain a second set of measurements between a second subset of the plurality of electrodes, the second set of measurements related to capacitance between the second subset of the electrodes; and the proximity detector is to detect at least a first threshold change in the first set of measurements; detect at least a second threshold change in the second set of measurements; and in response to detecting at least the first threshold change in the first set of measurements and detecting at least the second threshold change in the second set of measurements, determine that an object is approaching the face of the device.

Example 2 provides the system of example 1, where the device includes a display screen, and each of the plurality of electrodes is located behind the display screen.

Example 3 provides the system of example 1, where the first set of measurements are related to capacitance on a left side of the device, and the second set of measurements are related to capacitance on a right side of the device.

Example 4 provides the system of example 1, where the plurality of electrodes includes at least four electrodes, and the sensor is configured to obtain sets of measurements between four pairs of electrodes selected from the at least four electrodes.

Example 5 provides the system of example 4, where two pairs of the four pairs of electrodes obtain measurements related to capacitance along a left side of the device, and two of the pairs of the four pairs of electrodes obtain measurements related to capacitance along a right side of the device.

Example 6 provides the system of example 1, where the proximity detector is configured to receive the first set of measurements from the sensor; filter the first set of measurements; compute a set of differences of the filtered first set of measurements; and compare each of the set of differences to the first threshold.

Example 7 provides the system of example 1, where the proximity detector is further configured to perform a smoothing process on changes in the first set of measurements and changes in the second set of measurements; and determine that an object is approaching the face of the device based on a result of the smoothing process.

Example 8 provides the system of example 1, where the sensor includes an impedance bridge; and a switching circuit to alternately couple the first subset of the electrodes to the impedance bridge and the second subset of the electrodes to the impedance bridge.

Example 9 provides the system of example 8, the impedance bridge including a first impedance element, a second impedance element, and a third impedance element, where the first impedance element is a variable impedance element.

Example 10 provides the system of example 9, further including circuitry to adjust an impedance of the first impedance element to balance an offset impedance on a subset of electrodes coupled to the sensor.

Example 11 provides the system of example 8, further including an input terminal coupled to the impedance bridge to apply a stimulus signal to the impedance bridge; and an amplifier circuit coupled to a first output terminal and a second output terminal of the impedance bridge, the amplifier circuit configured to output the first set of measurements and the second set of measurements based on signals from the first output terminal and the second output terminal.

Example 12 provides a proximity detection method including obtaining a first set of measurements between a first subset of a plurality of electrodes along a face of a device, the first set of measurements related to capacitance between the first subset of the electrodes; obtaining a second set of measurements between a second subset of the plurality of electrodes, the second set of measurements related to capacitance between the second subset of the electrodes; detecting at least a first threshold change in the first set of measurements; detecting at least a second threshold change in the second set of measurements; and in response to detecting at least the first threshold change in the first set of measurements and detecting at least the second threshold change in the second set of measurements, outputting a signal indicating that an object is approaching the face of the device.

Example 13 provides the method of example 12, further including filtering the first set of measurements with a noise reduction filter; and filtering the second set of measurements with the noise reduction filter.

Example 14 provides the method of example 12, where detecting at least a first threshold change in the first set of measurements includes calculating a first-difference (FD) estimator from the first set of measurements, the FD estimator calculated by subtracting a measurement at a first time from a measurement at a second time; comparing the FD estimator to the first threshold; and in response to the FD estimator being greater than the first threshold, detecting at least the threshold change in the first set of measurements.

Example 15 provides the method of example 14, where the FD estimator is a first FD estimator, and detecting at least a second threshold change in the second set of measurements includes calculating a second FD estimator from the second set of measurements, the second FD estimator calculated by subtracting a measurement in the second set of measurements at the first time from a measurement in the second set of measurements at the second time; comparing the second FD estimator to the second threshold; and in response to the second FD estimator being greater than the second threshold, detecting at least the second threshold change in the second set of measurements.

Example 16 provides the method of example 15, where the first time and the second time include a time period, and the signal is output in response to both the first FD estimator exceeding the first threshold and the second FD estimator exceeding the second threshold during the time period.

Example 17 provides the method of example 12, further including generating a smoothed detection metric based on detecting the first threshold change in the first set of measurements and the second threshold change in the second set of measurements over a period of time; and determining whether to output the signal based on the smoothed detection metric.

Example 18 provides the method of example 17, where the smoothed detection metric is generated using a first Hidden Markov Model (HMM), the first HMM having a state space including the first set of measurements and detection of the first threshold change in the first set of measurements, and a second HMM, the second HMM having a state space including the second set of measurements and detection of the second threshold change in the second set of measurements.

Example 19 provides a sensor system including a plurality of electrodes arranged at different positions along a face of a device; a sensor coupled to the plurality of electrodes, the sensor to obtain a first set of measurements related to a mutual-mode capacitance between a first pair of the plurality of electrodes, and a second set of measurements related to a mutual-mode capacitance between a second pair of the plurality of electrodes; and a proximity detector to detect at least a threshold change in the first set of measurements; detect at least the threshold change in the second set of measurements; and output a detection signal in response to detecting at least the threshold change in the first set of measurements and detecting at least the threshold change in the second set of measurements.

Example 20 provides the system of example 19, where the first set of measurements are related to capacitance on a left side of the device, and the second set of measurements are related to capacitance on a right side of the device.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A proximity sensor system comprising:

a sensor couplable to a plurality of electrodes arranged adjacent to a face of a device in a layout of discrete spaced-apart areas, the sensor configured to:

obtain a first set of measurements between a first subset of the plurality of electrodes, the first set of measurements related to respective capacitances between at least one pair of electrodes in the first subset of the plurality of electrodes; and obtain a second set of measurements between a second subset of the plurality of electrodes, the second set of measurements related to respective capacitances between at least one pair of electrodes in the second subset of the plurality of electrodes; and a proximity detector configured to:

detect at least a first threshold change in the first set of measurements;

detect at least a second threshold change in the second set of measurements; and in response to detecting at least the first threshold change in the first set of measurements and detecting at least the second threshold change in the second set of measurements, determine that an object is approaching the face of the device.

2. The system of claim 1, wherein the device comprises a display screen having a first side facing an exterior of the device and a second side facing an interior of the device, and each electrode of the plurality of electrodes is located adjacent to the first side of the display screen.

3. The system of claim 1, wherein the first set of measurements are related to capacitance on a first edge of the device, and the second set of measurements are related to capacitance on a second edge of the device.

4. The system of claim 1, wherein the plurality of electrodes comprises at least four electrodes, and the sensor is configured to obtain sets of measurements between four pairs of electrodes selected from the at least four electrodes.

5. The system of claim 4, wherein two pairs of the four pairs of electrodes permit obtaining measurements related to capacitance along a first edge of the device, and two other pairs of the four pairs of electrodes permit obtaining measurements related to capacitance along a second edge of the device.

6. The system of claim 1, wherein the proximity detector is configured to:

receive the first set of measurements from the sensor;

filter the first set of measurements;

compute a set of differences of the filtered first set of measurements; and compare each of the set of differences to the first threshold change.

7. The system of claim 1, wherein the proximity detector is further configured to:

perform a smoothing process on changes in the first set of measurements and changes in the second set of measurements; and determine that an object is approaching the face of the device based on a result of the smoothing process.

8. The system of claim 1, wherein the sensor comprises:

an impedance bridge; and a switching circuit configured to alternately couple the first subset of the plurality of electrodes to the impedance bridge and the second subset of the plurality of electrodes to the impedance bridge.

9. The system of claim 8, the impedance bridge comprising a first impedance element, a second impedance element, and a third impedance element, wherein the first impedance element is a variable impedance element.

10. The system of claim 9, further comprising circuitry configured to adjust an impedance of the first impedance element to balance an offset impedance on a subset of electrodes coupled to the sensor.

11. The system of claim 8, further comprising:

an input terminal coupled to the impedance bridge to apply a stimulus signal to the impedance bridge; and an amplifier circuit coupled to a first output terminal and a second output terminal of the impedance bridge, the amplifier circuit configured to output the first set of measurements and the second set of measurements based on signals from the first output terminal and the second output terminal.

12. A proximity detection method comprising:

obtaining a first set of measurements between a first subset of a plurality of electrodes disposed adjacent to a face of a device in a layout of discrete spaced-apart areas, the first set of measurements related to respective capacitances between at least one pair of electrodes in the first subset of the plurality of electrodes;

obtaining a second set of measurements between a second subset of the plurality of electrodes, the second set of measurements related to respective capacitances between at least one pair of electrodes in the second subset of the plurality of electrodes;

detecting at least a first threshold change in the first set of measurements;

detecting at least a second threshold change in the second set of measurements; and in response to detecting at least the first threshold change in the first set of measurements and detecting at least the second threshold change in the second set of measurements, outputting a signal indicating that an object is approaching the face of the device.

13. The method of claim 12, further comprising:

filtering the first set of measurements with a noise reduction filter; and filtering the second set of measurements with the noise reduction filter.

14. The method of claim 12, wherein detecting at least a first threshold change in the first set of measurements comprises:

calculating a first-difference (FD) estimator from the first set of measurements, the FD estimator calculated by subtracting a measurement at a first time from a measurement at a second time;

comparing the FD estimator to the first threshold change; and in response to the FD estimator being greater than the first threshold change, detecting at least the first threshold change in the first set of measurements.

15. The method of claim 14, wherein the FD estimator is a first FD estimator, and detecting at least a second threshold change in the second set of measurements comprises:

calculating a second FD estimator from the second set of measurements, the second FD estimator calculated by subtracting a measurement in the second set of measurements at the first time from a measurement in the second set of measurements at the second time;

comparing the second FD estimator to the second threshold change; and in response to the second FD estimator being greater than the second threshold change, detecting at least the second threshold change in the second set of measurements.

16. The method of claim 15, wherein the first time and the second time comprise a time period, and the signal is output in response to both the first FD estimator exceeding the first threshold change and the second FD estimator exceeding the second threshold change during the time period.

17. The method of claim 12, further comprising:

generating a smoothed detection metric based on detecting the first threshold change in the first set of measurements and the second threshold change in the second set of measurements over a period of time; and determining whether to output the signal based on the smoothed detection metric.

18. The method of claim 17, wherein the smoothed detection metric is generated using:

a first Hidden Markov Model (HMM), the first HMM having a state space comprising the first set of measurements and detection of the first threshold change in the first set of measurements, and a second HMM, the second HMM having a state space comprising the second set of measurements and detection of the second threshold change in the second set of measurements.

19. A sensor system comprising:

a plurality of electrodes disposed adjacent to a face of a device in a layout of discrete spaced-apart areas;

a sensor coupled to the plurality of electrodes, the sensor configured to obtain:

a first set of measurements related to a mutual-mode capacitance between a first pair of the plurality of electrodes, and a second set of measurements related to a mutual-mode capacitance between a second pair of the plurality of electrodes; and a proximity detector configured to:

detect at least a threshold change in the first set of measurements;

detect at least the threshold change in the second set of measurements; and output a detection signal in response to detecting at least the threshold change in the first set of measurements and detecting at least the threshold change in the second set of measurements.

20. The system of claim 19, wherein the first set of measurements are related to capacitance on a first edge of the device, and the second set of measurements are related to capacitance on a second edge of the device.

* * * * *